(12) United States Patent
Baer et al.

(10) Patent No.: US 10,830,990 B2
(45) Date of Patent: Nov. 10, 2020

(54) PRIMARY-SUBORDINATE CAMERA FOCUS BASED ON LENS POSITION SENSING

(71) Applicant: Apple Inc., Cupertino, CA (US)

(72) Inventors: Richard L. Baer, Los Altos, CA (US); Andrew David Fernandez, San Jose, CA (US); Santiago Alban, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/586,781

(22) Filed: Sep. 27, 2019

(65) Prior Publication Data

US 2020/0026030 A1 Jan. 23, 2020

Related U.S. Application Data

(63) Continuation of application No. 15/710,747, filed on Sep. 20, 2017, now Pat. No. 10,429,608.

(60) Provisional application No. 62/398,910, filed on Sep. 23, 2016.

(51) Int. Cl.
*H04N 5/232* (2006.01)
*G02B 13/22* (2006.01)
*G02B 7/28* (2006.01)
*G03B 13/36* (2006.01)

(52) U.S. Cl.
CPC ............ *G02B 7/285* (2013.01); *G02B 13/22* (2013.01); *G03B 13/36* (2013.01); *H04N 5/23212* (2013.01)

(58) Field of Classification Search
CPC ........ G02B 7/285; G02B 13/22; G03B 13/36; H04N 5/23212
See application file for complete search history.

(56) References Cited

U.S. PATENT DOCUMENTS

| 8,675,073 | B2 | 3/2014 | Aagaard et al. |
| 9,313,390 | B2 | 4/2016 | Velarde et al. |
| 2011/0075018 | A1 | 3/2011 | Kohama |
| 2011/0234768 | A1* | 9/2011 | Pan ........................ G03B 13/36 348/47 |
| 2013/0002830 | A1 | 1/2013 | Pan |
| 2014/0071330 | A1 | 3/2014 | Zhang et al. |
| 2014/0168383 | A1 | 6/2014 | Murakami |
| 2016/0227100 | A1* | 8/2016 | Liu .................... H04N 5/23212 |
| 2016/0295097 | A1* | 10/2016 | Shanmugavadivelu ..................... H04N 5/2258 |
| 2017/0150126 | A1 | 5/2017 | Kim |
| 2017/0201673 | A1 | 7/2017 | Xiao |
| 2017/0223256 | A1* | 8/2017 | Xiao .................. H04N 5/23212 |

* cited by examiner

*Primary Examiner* — Hung H Lam
(74) *Attorney, Agent, or Firm* — Robert C. Kowert; Kowert, Hood, Munyon, Ranikin & Goetzel, P.C.

(57) ABSTRACT

Various embodiments disclosed herein include techniques for maintaining multiple cameras in focus on same objects and/or at same distances. In some examples, a subordinate camera may be configured to focus based on the focus of a primary camera. For instance, a focus relationship between the primary camera and the subordinate camera may be determined. The focus relationship may characterize the trajectory of the lens position of the subordinate camera with respect to the lens position of the primary camera. In various examples, the focus relationship may be updated.

20 Claims, 16 Drawing Sheets

PRIMARY-SUBORDINATE CAMERA FOCUS BASED ON LENS POSITION SENSING

This application is a continuation of U.S. application Ser. No. 15/710,747, filed Sep. 20, 2017, which claims benefit of priority to U.S. Provisional Application No. 62/398,910, filed Sep. 23, 2016, which are hereby incorporated by reference in their entirety.

BACKGROUND

Technical Field

This disclosure relates generally to focusing multiple cameras and more specifically to focusing multiple cameras on a same image subject based at least in part on a focus relationship between the cameras.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the x and/or y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (or the z axis) of the camera to refocus the camera.

In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation/disturbance by adjusting location of the optical lens on the X and/or Y axis in an attempt to compensate for unwanted motion of the lens. In such systems, knowledge of the position of the lens is useful.

SUMMARY OF EMBODIMENTS

Various implementations disclosed herein include techniques for maintaining multiple cameras (e.g., dissimilar cameras) in focus on same objects and/or at same distances. In some examples, a subordinate camera may be configured to focus based on the focus of a primary camera. For instance, a focus relationship between the primary camera and the subordinate camera may be determined. The focus relationship may characterize the trajectory of the lens position of the subordinate camera with respect to the lens position of the primary camera. In various examples, the focus relationship may be updated from time to time.

Figure 1:
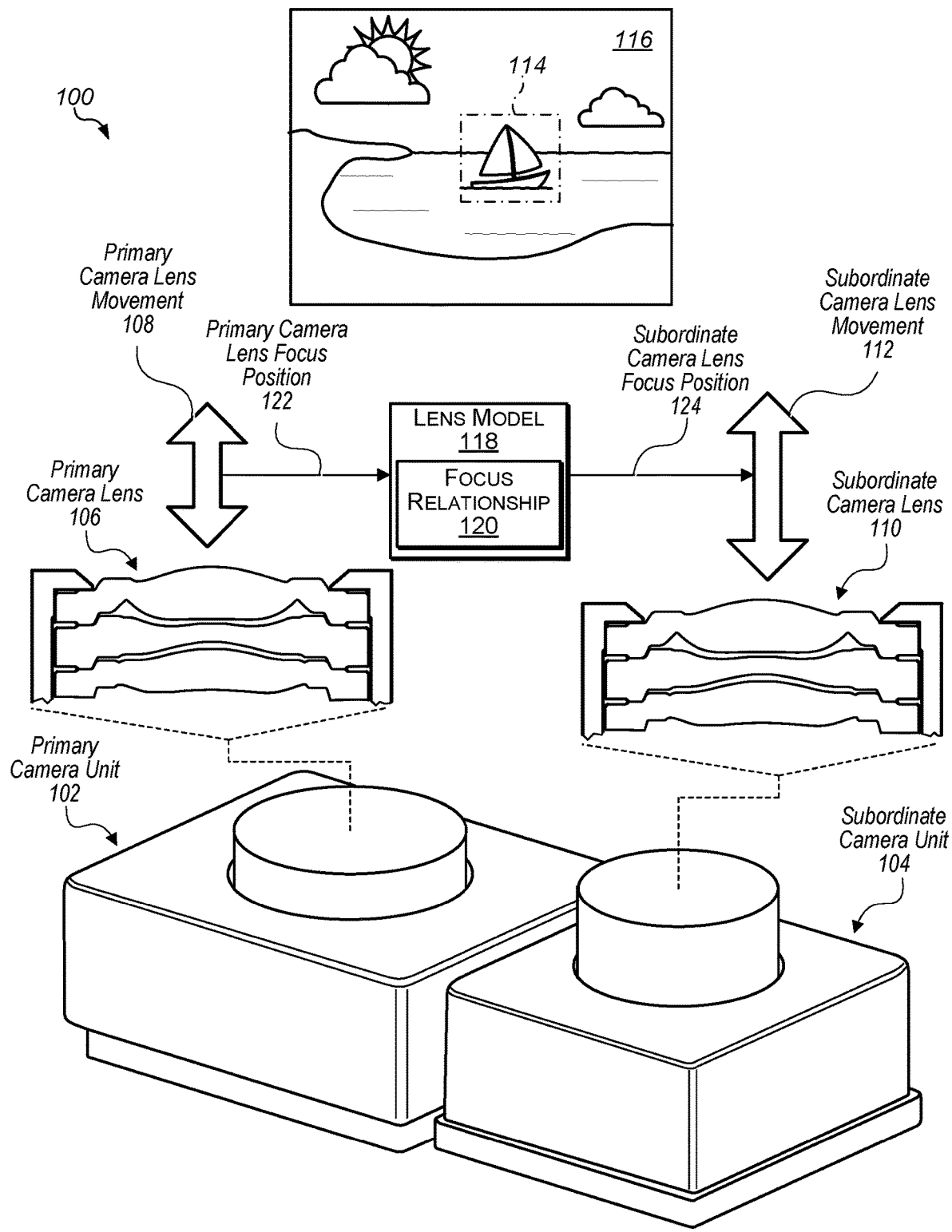
FIG. 1 illustrates a perspective view of an example camera system that includes an example primary camera unit and an example subordinate camera unit, in accordance with some embodiments. The example subordinate camera unit of FIG. 1 may be focused on an image subject based on a focus relationship between the example subordinate camera unit and the example primary camera unit, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various implementations disclosed herein include techniques for maintaining multiple cameras (e.g., dissimilar cameras) in focus on same objects and/or at same distances. In some examples, a subordinate camera may be configured to focus based on the focus of a primary camera. For instance, a focus relationship between the primary camera and the subordinate camera may be determined. The focus relationship may characterize the trajectory of the lens position of the subordinate camera with respect to the lens position of the primary camera. In various examples, the focus relationship may be updated from time to time.

Some embodiments include a camera system. The camera system may include a primary camera and a subordinate camera. The primary camera may include a first set of one or more lenses (also referred to herein as a "primary camera lens") that define a first optical axis and a first focal length. In some examples, the primary camera may include a first actuator (e.g., a voice coil motor (VCM) actuator) configured to move the primary camera lens along the first optical axis to enable focusing for the primary camera. The subordinate camera may include a second set of one or more lenses (also referred to herein as a "subordinate camera lens") that define a second optical axis and a second focal length. In various cases, the second optical axis of the subordinate camera may be parallel, or substantially parallel, to the first optical axis of the primary camera. Additionally, or alternatively, the second focal length of the subordinate camera may be different than the first focal length of the primary camera. In some examples, the subordinate camera may include a second actuator (e.g., a VCM actuator) configured to move the subordinate camera lens along the second optical axis to enable focusing for the subordinate camera. Although the primary camera and the subordinate camera are described herein as possibly having different focal lengths, the primary camera and the subordinate camera may additionally or alternatively be similar, identical, and/or dissimilar in other ways (e.g., by having different minimum focus distances).

In some embodiments, the camera system may include one or more processors and memory. The memory may include program instructions that, when executed by the one or more processors, cause the one or more processors to perform operations. In some implementations, the operations may include determining a focus relationship that characterizes focus positioning of the subordinate camera lens with respect to focus positioning of the primary camera lens. In some examples, the operations may include causing the primary camera to independently focus on an image subject. For instance, the primary camera may be focused on the image subject based at least in part on image content corresponding to the image subject. Furthermore, the operations may include causing the subordinate camera to focus on the image subject based at least in part on the focus relationship.

In some examples, determination of the focus relationship may include causing the primary camera and the subordinate camera to focus on image subjects (e.g., same image subjects at same distances). A first set of position data and a second set of position data may be obtained based on focusing the primary camera and focusing the subordinate camera, respectively. The first set of position data may correspond to respective focus positions of the primary camera lens based at least in part on focusing the primary camera on the image subjects. The second set of position data may correspond to respective focus positions of the subordinate camera lens based at least in part on focusing the subordinate camera on the image subjects. In various implementations, the focus relationship may be determined based at least in part on the first set of position data and the second set of position data.

According to various embodiments, the focus relationship may include an offset term that is variable based at least in part on one or more parameters corresponding to the primary camera and/or the subordinate camera. For instance, the parameters may include a respective temperature associated with the primary camera and/or the subordinate camera. In some cases, the parameters may include a first temperature associated with the primary camera lens and/or a second temperature associated with the subordinate camera lens. As lens temperatures may change during operation of the cameras, the offset term of the focus relationship may also change.

In some embodiments, the focus relationship between the primary camera and the subordinate camera may be updated. In some cases, the focus relationship may be updated to account for a change in the offset term of the focus relationship, which, in turn, may be caused by a change in one or more parameters associated with the primary camera and/or the subordinate camera. In some examples, the focus relationship may be determined during a first time period, and then may be updated during a second time period after the first time period. In some instances, the terms "first time period" and "second time period" are used herein as example time periods corresponding to determining the focus relationship and updating the focus relationship, respectively, but the focus relationship may also be updated during other time periods in a recursive process.

The operations for updating the focus relationship may include causing, during the second time period, the primary camera to focus on at least one subject image. A third set of position data may be obtained during the second time period. The third set of position data may correspond to one or more focus positions of the primary camera lens based at least in part on causing the primary camera to focus on the image subject(s). Furthermore, the operations may include causing, during the second time period, the subordinate camera to focus on the image subject(s) (e.g., the same image subject(s) as those focused on by the primary camera during the second time period). A fourth set of position data may be obtained during the second time period. The fourth set of position data may correspond to one or more focus positions of the subordinate camera lens based at least in part on focusing the subordinate camera on the image subject(s). In various implementations, the second focus relationship may be determined based at least in part on the third set of position data and the fourth set of position data.

Updating the focus relationship may include updating the offset term of the focus relationship. In some examples, a current state of one or more parameters (e.g., temperature) associated with the primary camera and/or the subordinate camera may be determined, and the offset term of the focus relationship may be updated based at least in part on the current state of the parameter(s).

In some embodiments, the camera system may include a primary camera and multiple subordinate cameras. For instance, the subordinate camera described above may be a first subordinate camera, and the camera system may further include a second subordinate camera. The second subordinate camera may include a third set of one or more lenses (also referred to herein as a "second subordinate camera lens") that define a third optical axis and a third focal length. In various cases, the third optical axis of the second subordinate camera may be parallel, or substantially parallel, to the first optical axis of the primary camera and/or to the second optical axis of the first subordinate camera. Additionally, or alternatively, the third focal length of the second subordinate camera may be different than the first focal length of the primary camera and/or the second focal length of the first subordinate camera. In some examples, the second subordinate camera may include a third actuator (e.g., a VCM actuator) configured to move the second subordinate camera lens along the second optical axis to enable focusing for the second subordinate camera.

In some examples, a focus relationship (also referred to herein as a "second subordinate camera focus relationship") between the second subordinate camera and one or more of the primary camera or the first subordinate camera may be determined. For instance, a second subordinate camera focus relationship may characterize focus positioning of the second subordinate camera lens with respect to focus positioning of the primary camera lens. Additionally, or alternatively, a second subordinate camera focus relationship may characterize focus positioning of the second subordinate camera lens with respect to focus positioning of the first subordinate camera lens. The operations may include causing the second subordinate camera to focus on an image subject based at least in part on one or more second subordinate camera focus relationships.

Some embodiments include a method. The method may include focusing a primary camera on an image subject based at least in part on image content corresponding to the image subject. The primary camera may include a primary camera lens that defines a first optical axis and a first focal length. A focus position of the primary camera lens, at which the primary camera is focused on the image subject, may be determined. Furthermore, the method may include focusing a subordinate camera on the image subject based at least in part on the focus position of the primary camera lens and a focus relationship between the subordinate camera and the primary camera. The subordinate camera may include a subordinate camera lens that defines a second optical axis and a second focal length. In some examples, the second focal length of the subordinate camera may be different than the first focal length of the primary camera. The focus relationship may characterize focus positioning of the subordinate camera lens with respect to focus positioning of the primary camera lens. In this manner, focusing the subordinate camera may include driving the subordinate camera lens position without independently focusing the subordinate camera based on the image content corresponding to the image subject.

In some examples, focusing the primary camera may include moving the primary camera lens along the first optical axis to a first focus position at which the first camera is focused on the image subject. For instance, the primary camera lens may be moved via a first voice coil motor (VCM). Furthermore, focusing the subordinate camera may include moving the subordinate camera lens along the second optical axis to a second focus position at which the subordinate camera is focused on the image subject (e.g., based at least in part on the focus relationship between the subordinate camera and the primary camera).

In some examples, determination of the focus relationship may include focusing the primary camera and the subordinate camera on image subjects (e.g., same image subjects at same distances). A first set of position data and a second set of position data may be obtained based at least in part on focusing the primary camera and focusing the subordinate camera, respectively. The first set of position data may correspond to respective focus positions of the primary camera lens based at least in part on focusing the primary camera on the image subjects. The second set of position data may correspond to respective focus positions of the subordinate camera lens based at least in part on focusing the subordinate camera on the image subjects. In some cases, the first set of position data may be obtained via one or more position sensors of the primary camera. Likewise, the second set of position data may be obtained via one or more position sensors of the subordinate camera. In various implementations, the focus relationship may be determined based at least in part on the first set of position data and the second set of position data.

According to various embodiments, the focus relationship may include an offset term that is variable based at least in part on one or more parameters corresponding to the primary camera and/or the subordinate camera. For instance, the parameters correspond to parameters that may affect focus positioning of the primary camera lens and/or the subordinate camera lens. For example, the parameters may include a first temperature associated with the primary camera lens and/or a second temperature associated with the subordinate camera lens.

In some embodiments, the focus relationship between the primary camera and the subordinate camera may be updated. In some cases, the focus relationship may be updated to account for a change in the offset term of the focus relationship, which, in turn, may be caused by a change in one or more parameters associated with the primary camera and/or the subordinate camera. In some examples, the focus relationship may be determined during a first time period and may be updated during a second time period after the first time period. The primary camera may be focused, during the second time period, on at least one image subject. A third set of position data may be obtained during the second time period. The third set of position data may correspond to one or more focus positions of the primary camera lens based at least in part on causing the primary camera to focus on the image subject(s). Furthermore, the subordinate camera may be focused, during the second time period, on the image subject(s) (e.g., the same image subject(s) as those focused on by the primary camera during the second time period). A fourth set of position data may be obtained during the second time period. The fourth set of position data may correspond to one or more focus positions of the subordinate camera lens based at least in part on focusing the subordinate camera on the image subject(s). In various implementations, an updated focus relationship may be determined based at least in part on the third set of position data and the fourth set of position data.

Updating the focus relationship may include updating the offset term of the focus relationship. In some examples, a current state of one or more parameters (e.g., temperature) associated with the primary camera and/or the subordinate camera may be determined, and the offset term of the focus relationship may be updated based at least in part on the current state of the parameter(s).

In some examples, the subordinate camera may be configured to focus by moving the subordinate camera lens in search of a focus position within a first focus range. While updating the focus relationship (e.g., during the second time period), the subordinate camera may be focused on the image subject(s) by constraining the search, of the focus position(s) of the subordinate camera lens at which the subordinate camera is focused on the image subject(s), to a second focus range. For instance, the second focus range may be smaller than the first focus range. Accordingly, by constraining the search to the second focus range, the subordinate camera may find the focus position faster than it would have under an unconstrained search of the larger first focus range. In some instances, the method may include calculating a confidence level of the focus relationship, and determining the second focus range (e.g., for updating the focus relationship) based at least in part on the confidence level of the focus relationship.

Some embodiments include a mobile device (e.g., a mobile multifunction device). The mobile device may include a primary camera unit and a subordinate camera unit. The primary camera unit may include a first optical package that includes one or more lens elements (also referred to herein as a "primary camera unit lens") that define a first optical axis and a first focal length. In some examples, the primary camera unit may include a first actuator (e.g., a voice coil motor (VCM) actuator) configured to move the primary camera unit lens along the first optical axis to enable autofocus functionality for the primary camera unit. The primary camera unit may be configured to provide the autofocus functionality by independently focusing the primary camera unit on respective image subjects based at least in part on respective image content corresponding to the respective image subjects.

The subordinate camera unit may include a second optical package that includes one or more lenses (also referred to herein as a "subordinate camera unit lens") that define a second optical axis and a second focal length. In various cases, the second optical axis of the subordinate camera unit may be parallel, or substantially parallel, to the first optical axis of the primary camera unit. Additionally, or alternatively, the second focal length of the subordinate camera unit may be different than the first focal length of the primary camera unit. For instance, in some embodiments, one of the primary camera unit or the subordinate camera unit may be a telephoto lens camera, and the other of the primary camera unit or the subordinate camera unit may be a wide angle lens camera. In some examples, the subordinate camera unit may include a second actuator (e.g., a VCM actuator) configured to move the subordinate camera unit lens along the second optical axis to enable autofocus functionality for the subordinate camera unit. The subordinate camera unit may be configured to provide the autofocus functionality by moving, via the second actuator, the subordinate camera unit lens to a focus position based at least in part on a focus relationship, between the subordinate camera unit and the primary camera unit, such that the subordinate camera unit and the primary camera unit are focused on a same image subject.

The focus relationship may characterize positioning of the subordinate camera unit lens with respect to positioning of the primary camera unit lens. In some examples, the focus relationship may be determined based at least in part on the first focal length of the primary camera unit and the second focal length of the subordinate camera unit. Furthermore, the focus relationship may include an offset term that is variable based at least in part on parameters corresponding to the primary camera unit and/or the subordinate camera unit. In various examples, the parameters may correspond to parameters that may impact focus positioning of the primary camera unit lens and/or the subordinate camera unit lens. For example, the parameters may include a first temperature associated with the primary camera unit lens and/or a second temperature associated with the subordinate camera unit lens.

In some examples, the mobile device may include one or more processors and memory. The memory may include program instructions that, when executed by the one or more processors, cause the one or more processors to perform operations. For instance, the operations may include transitioning from a primary camera mode to a subordinate camera mode. Additionally, or alternatively, the operations may include transitioning from the subordinate camera mode to the primary camera mode. In the primary camera mode, the primary camera unit may be designated as an active camera for image capturing. Furthermore, in the subordinate camera mode, the subordinate camera unit may be designated as the active camera for image capturing. In various embodiments, continuity of focus on the same subject image by the primary camera unit and the subordinate camera unit may be maintained across the transition from the primary camera mode to the subordinate camera mode. Similarly, continuity of focus on the same subject image by the primary camera unit and the subordinate camera unit may be maintained across the transition from the subordinate camera mode to the primary camera mode.

In various embodiments, the operations may include determining the focus relationship. Determination of the focus relationship may include causing the primary camera unit and the subordinate camera unit to focus on image subjects (e.g., same image subjects at same distances). A first set of position data and a second set of position data may be obtained based on focusing the primary camera unit and focusing the subordinate camera unit, respectively. The first set of position data may correspond to respective focus positions of the primary camera unit lens based at least in part on focusing the primary camera unit on the image subjects. The second set of position data may correspond to respective focus positions of the subordinate camera unit lens based at least in part on focusing the subordinate camera unit on the image subjects. In various implementations, the focus relationship may be determined based at least in part on the first set of position data and the second set of position data.

In some embodiments, the operations may include causing the primary camera unit to capture a first image of an image subject. Furthermore, the operations may include causing the subordinate camera unit to capture a second image of the image subject. In some cases, a third image may be generated based at least in part on the first image and the second image. In various examples, continuity of focus on the subject image by the primary camera unit and the subordinate camera unit is maintained across the operations of causing the primary camera unit to capture the first image and causing the subordinate camera unit to capture the second image.

In various embodiments, the operations may include periodically updating the focus relationship. For instance, updating the focus relationship may include updating the offset term of the focus relationship based at least in part on a change in value of one or multiple parameters corresponding to the primary camera unit and/or the second camera unit.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a perspective view of an example camera system 100 that includes an example primary camera unit 102 (also referred to herein as a "primary camera" or a "primary camera module") and an example subordinate camera unit 104 (also referred to herein as a "subordinate camera" or a "subordinate camera module"), in accordance with some embodiments.

Figure 12:
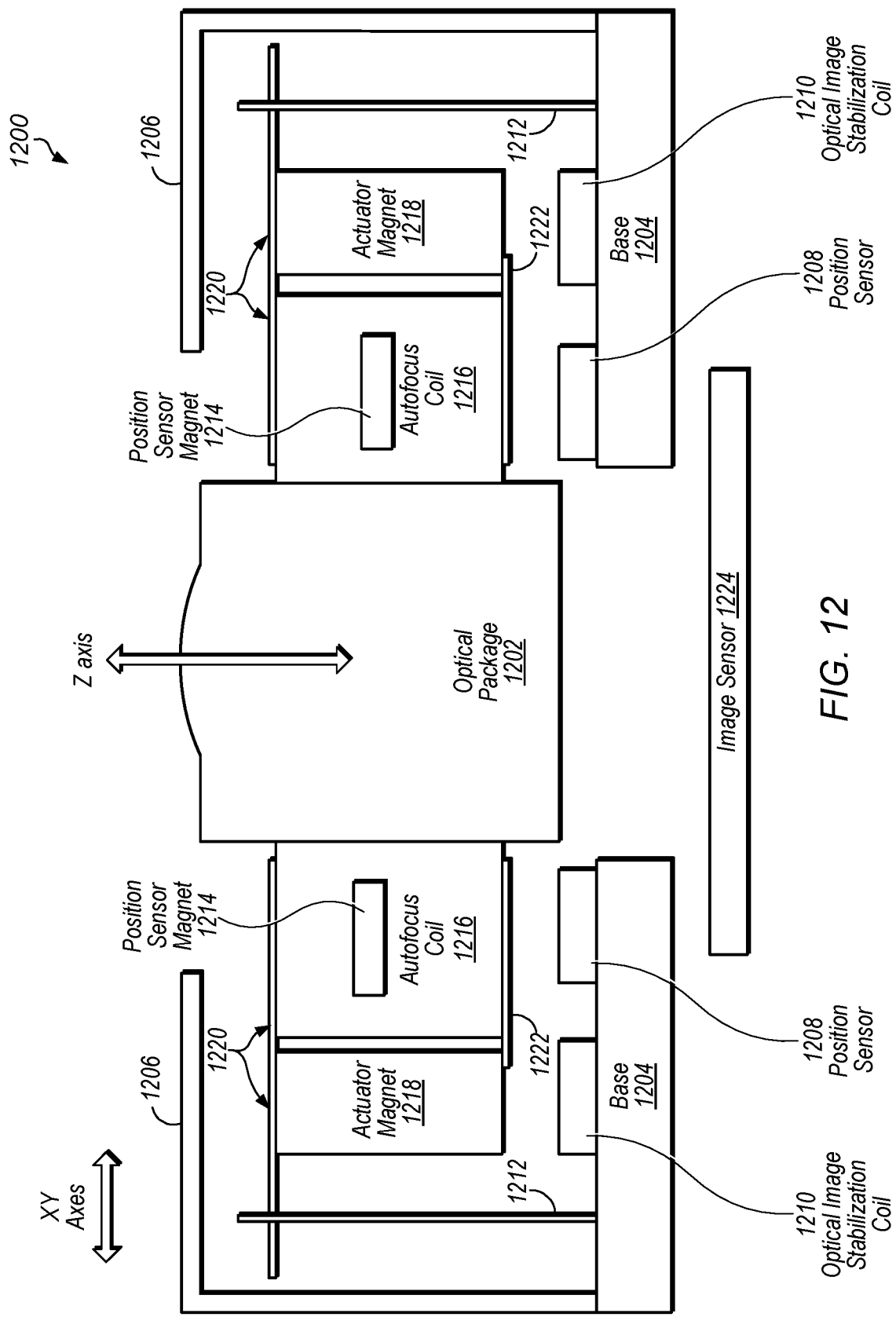
FIG. 12 illustrates a schematic side view of an example camera module having an example voice coil motor (VCM) actuator for moving an optical package, in accordance with some embodiments.

In various examples, the primary camera unit 102 may include a first optical package that includes a first set of one or more lenses 106 (also referred to herein as a "primary camera lens") that define a first optical axis and a first focal length. In some cases, the first focal length may be adjustable within a range of focal lengths. In some examples, the primary camera unit 102 may include a first actuator (e.g., a voice coil motor (VCM) actuator as illustrated in FIG. 12) configured to move the primary camera lens 106 along the first optical axis to enable focusing for the primary camera unit 102. For instance, the primary camera lens 106 may move along the first optical axis as indicated by the primary camera lens movement arrow 108.

The subordinate camera unit 104 may include a second set of one or more lenses 110 (also referred to herein as a "subordinate camera lens") that define a second optical axis and a second focal length. In various cases, the second optical axis of the subordinate camera unit 104 may be parallel, or substantially parallel, to the first optical axis of the primary camera unit 102. Additionally, or alternatively, the second focal length of the subordinate camera unit 104 may be different than the first focal length of the primary camera unit 102. For instance, in some embodiments, one of the primary camera unit 102 or the subordinate camera unit 104 may be a telephoto lens camera, and the other of the primary camera unit 102 or the subordinate camera unit 104 may be a wide angle lens camera. In some cases, the second focal length may be adjustable within a range of focal lengths. In some examples, the subordinate camera unit 104 may include a second actuator (e.g., a VCM actuator as illustrated in FIG. 12) configured to move the subordinate camera lens 110 along the second optical axis to enable focusing for the subordinate camera unit 104. For instance, the subordinate camera lens 110 may move along the second optical axis as indicated by the subordinate camera lens movement arrow 112. Although the primary camera unit 102 and the subordinate camera unit 104 are described herein as possibly having different focal lengths, the primary camera unit 102 and the subordinate camera unit 104 may additionally or alternatively be similar, identical, and/or dissimilar in other ways (e.g., by having different minimum focus distances).

Figure 13:
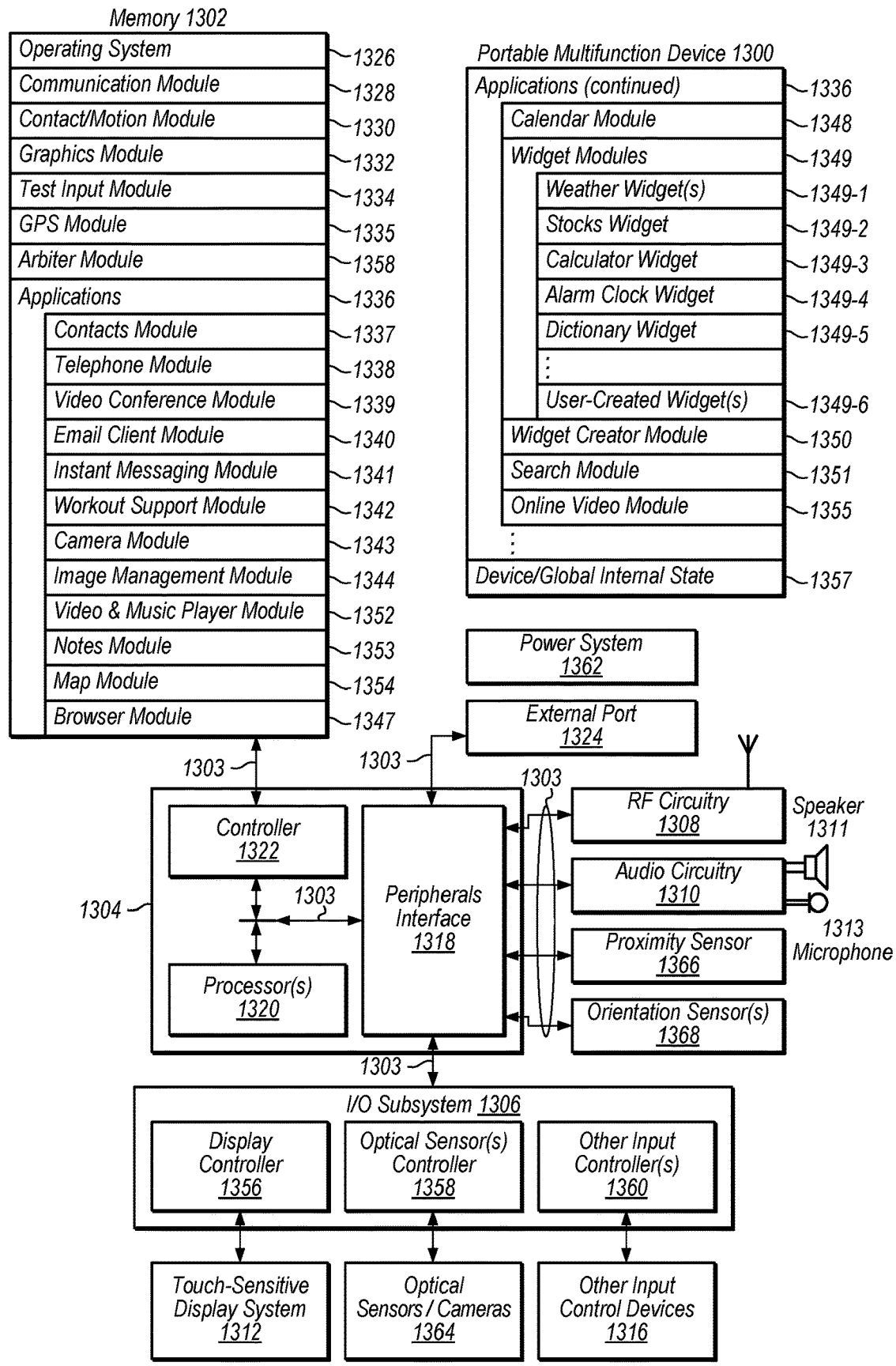
FIG. 13 illustrates a block diagram of an example portable multifunction device that may include a primary camera and a subordinate camera, in accordance with some embodiments.

In some embodiments, the camera system 100 may include one or more processors and memory (e.g., as described below with reference to FIGS. 13 and 15). The memory may include program instructions that, when executed by the one or more processors, cause the one or more processors to perform operations, e.g., one or more of the operations described below with reference to FIGS. 2-6 and 9-11. Additionally, or alternatively, the camera system 100 may include a controller (not shown) that performs the operations.

In some implementations, the operations may include causing the primary camera unit 102 and the subordinate camera unit 104 to focus on objects. For instance, the primary camera unit 102 may be focused on an image subject 114 (e.g., the sailboat depicted in FIG. 1) within a scene 116 (e.g., the coast-water-sailboat-sky scene depicted in FIG. 1). In some examples, the primary camera unit 102 may be focused on the image subject 114 based at least in part on image content corresponding to the image subject 114. For instance, focusing of the primary camera unit 102 on the image subject 114 may include adjusting the position of the primary camera lens 108 based at least in part on one or more metrics (e.g., sharpness, contrast, etc.). In a non-limiting example, the position of the primary camera lens 108 may be adjusted to satisfy a threshold image metric (e.g., a threshold sharpness, a threshold contrast, etc.) that indicates that the primary camera unit 102 is focused on the image subject 114. Additionally or alternatively, the primary camera unit 102 may be focused on the image subject 114 based at least in part on one or more autofocus techniques (e.g., phase detection, contrast detection, laser autofocus, etc.).

In some implementations, the subordinate camera unit 104 may be focused on the same image subject 114. In some instances, the subordinate camera unit 104 may be focused on the image subject 114 when the subordinate camera unit 104 is at or about the same distance away from the image subject 114 as the primary camera unit 102. For example, the subordinate camera unit 104 may be adjacent to the primary camera unit. Furthermore, the subordinate camera unit 104 may be focused on the image subject 114 at or about the same time as the primary camera unit is focused on the image subject 114.

In various implementations, the subordinate camera unit 104 may be focused on the same image subject 114 based at least in part on a lens model 118 that takes into account a focus relationship 120 between the primary camera unit 102 and the subordinate camera unit 104. The focus relationship 120 may characterize focus positioning of the subordinate camera lens 110 with respect to focus positioning of the primary camera lens 106. For example, the lens model 118 may receive the primary camera lens focus position 122 as an input, and output, based at least in part on the focus relationship 120, the subordinate camera lens focus position 124. As such, in various implementations, the subordinate camera unit 104 may be maintained in focus on the same image subject 114 as the primary camera unit 102 without independently searching for a focus position over a focus range of the subordinate camera lens 110. Thus, by using the lens model 118 and techniques described herein, the subordinate camera unit 104 may be focused on image subjects faster than in some conventional focusing techniques in which a camera relies on independently searching for a focus position over a focus range. As discussed in further detail below with reference to FIGS. 4-6 and 9-11, the lens model 118 and/or the focus relationship 120 may be updated from time to time.

Although FIG. 1 depicts a single primary camera unit 102 and a single subordinate camera unit 104, the camera system may, in some embodiments, include multiple primary camera units and/or multiple subordinate camera units. For instance, the subordinate camera unit 104 may be a first subordinate camera, and the camera system 100 may further include a second subordinate camera (not shown). The second subordinate camera may include a third set of one or more lenses (also referred to herein as a "second subordinate camera lens") that define a third optical axis and a third focal length. In various cases, the third optical axis of the second subordinate camera may be parallel, or substantially parallel, to the first optical axis of the primary camera and/or to the second optical axis of the first subordinate camera. Additionally, or alternatively, the third focal length of the second subordinate camera may be different than the first focal length of the primary camera and/or the second focal length of the first subordinate camera. In some examples, the second subordinate camera may include a third actuator (e.g., a VCM actuator) configured to move the second subordinate camera lens along the second optical axis to enable focusing for the second subordinate camera.

In some examples, a focus relationship (also referred to herein as a "second subordinate camera focus relationship") between the second subordinate camera and one or more of the primary camera or the first subordinate camera may be determined. For instance, a second subordinate camera focus relationship may characterize focus positioning of the second subordinate camera lens with respect to focus positioning of the primary camera lens. Additionally, or alternatively, a second subordinate camera focus relationship may characterize focus positioning of the second subordinate camera lens with respect to focus positioning of the first subordinate camera lens. The operations may include causing the second subordinate camera to focus on an image subject based at least in part on one or more second subordinate camera focus relationships.

Figure 2:
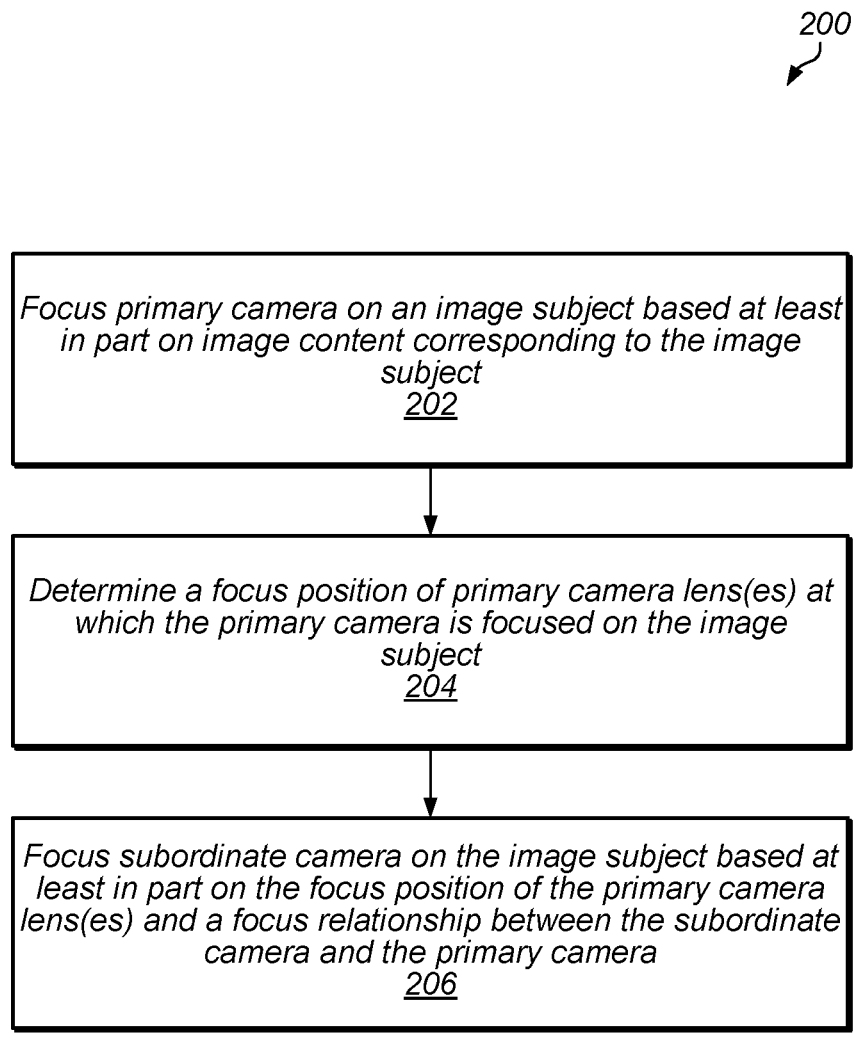
FIG. 2 is a flowchart of an example method of focusing a subordinate camera based on a focus relationship between the subordinate camera and a primary camera, in accordance with some embodiments.

FIG. 2 is a flowchart of an example method 200 of focusing a subordinate camera (e.g., the subordinate camera unit 104 described above with reference to FIG. 1) based on a focus relationship between the subordinate camera and a primary camera (e.g., the primary camera unit 102 described above with reference to FIG. 1), in accordance with some embodiments.

At 202, the method 200 may include focusing the primary camera on an image subject. In some examples, the primary camera may be focused on the image subject based at least in part on image content corresponding to the image subject. For instance, focusing of the primary camera on the image subject may include adjusting the position of the primary camera lens based at least in part on one or more metrics (e.g., sharpness, contrast, etc.). In a non-limiting example, the position of the primary camera lens may be adjusted to satisfy a threshold image metric (e.g., a threshold sharpness, a threshold contrast, etc.) that indicates that the primary camera is focused on the image subject. Additionally or alternatively, the primary camera may be focused on the image subject based at least in part on one or more autofocus techniques (e.g., phase detection, contrast detection, laser autofocus, etc.). At 204, the method 200 may include determining a focus position of the primary camera lens at which the primary camera is focused on the image subject. At 204, the method 200 may include focusing the subordinate camera on the image subject. For instance, the subordinate camera may be focused on the image subject based at least in part on the focus position of the primary camera and a focus relationship between the subordinate camera and the primary camera.

Figure 3:
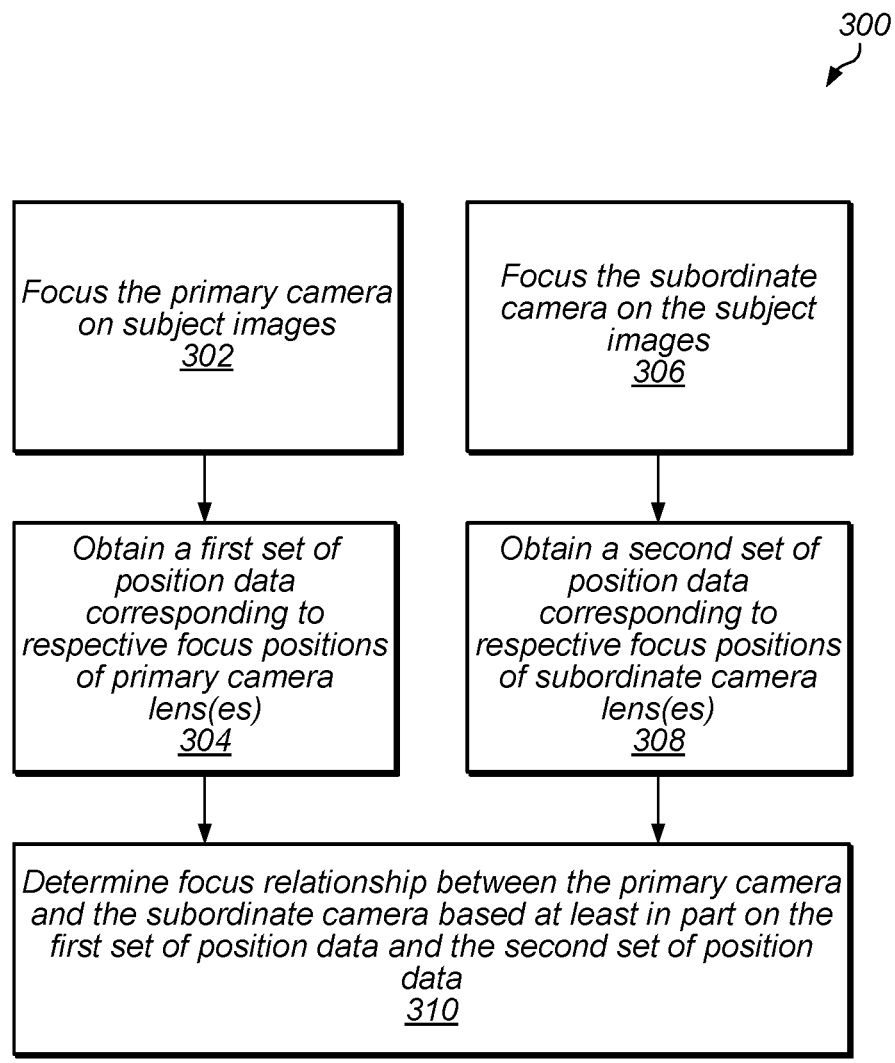
FIG. 3 is a flowchart of an example method of determining a focus relationship between a primary camera and a subordinate camera, in accordance with some embodiments.

FIG. 3 is a flowchart of an example method 300 of determining a focus relationship between a primary camera (e.g., the primary camera unit 102 described above with reference to FIG. 1) and a subordinate camera (e.g., the subordinate camera unit 104 described above with reference to FIG. 1), in accordance with some embodiments.

At 302, the method 300 may include focusing the primary camera on subject images. In various embodiments, the primary camera may be focused independently of the focusing of the subordinate camera, e.g., using one or more of the techniques described above with reference to FIGS. 1 and 2. At 304, the method 300 may include obtaining a first set of position data corresponding to respective focus positions of the primary camera lens. For instance, the first set of position data may be obtained at least partly via one or more position sensors (e.g., the position sensors 1208 described below with reference to FIG. 12) of the primary camera. In some examples, the position sensors may include one or more magnetic field sensors (e.g., Hall sensors, tunneling magnetoresistance (TMR) sensors, giant magnetoresistance (GMR) sensors, etc.). For instance, the primary camera may include a voice coil motor (VCM) actuator having one or more coils and one or more magnets, e.g., as described below with reference to FIG. 12. The coils may be configured to receive a current and magnetically interact with one or more magnets to produce Lorentz forces that cause the primary camera lens to move along an optical axis. One or more position sensor magnets (e.g., the position sensor magnets 1214 described below with reference to FIG. 12) may be coupled to the primary camera lens such that the position sensor magnets move along with the primary camera lens. One or more magnetic field sensors may be used to detect the position of the position sensor magnets, thereby enabling position sensing of the primary camera lens.

At 306, the method 300 may include focusing the subordinate camera on the subject images. In various embodiments, the subordinate camera may be focused independently of the focusing of the primary camera. In some examples, the primary camera may be focused on the image subject based at least in part on image content corresponding to the image subject. For instance, focusing of the subordinate camera on the image subjects may include adjusting the position of the primary camera lens based at least in part on one or more metrics (e.g., sharpness, contrast, etc.). In a non-limiting example, the position of the subordinate camera lens may be adjusted to satisfy a threshold image metric (e.g., a threshold sharpness, a threshold contrast, etc.) that indicates that the primary camera is focused on an image subject. Additionally or alternatively, the subordinate camera may be focused on the image subjects based at least in part on one or more autofocus techniques (e.g., phase detection, contrast detection, laser autofocus, etc.).

At 308, the method 300 may include obtaining a second set of position data corresponding to respective focus positions of the subordinate camera lens. For instance, the second set of position data may be obtained at least partly via one or more position sensors (e.g., the position sensors 1208 described below with reference to FIG. 12) of the subordinate camera. In some examples, the position sensors may include one or more magnetic field sensors (e.g., Hall sensors, TMR sensors, GMR sensors, etc.). For instance, the subordinate camera may include a VCM actuator having one or more coils and one or more magnets, e.g., as described below with reference to FIG. 12. The coils may be configured to receive a current and magnetically interact with one or more magnets to produce Lorentz forces that cause the subordinate camera lens to move along an optical axis. One or more position sensor magnets (e.g., the position sensor magnets 1214 described below with reference to FIG. 12) may be coupled to the subordinate camera lens such that the position sensor magnets move along with the subordinate camera lens. One or more magnetic field sensors may be used to detect the position of the position sensor magnets, thereby enabling position sensing of the subordinate camera lens.

At 310, the method 300 may include determining the focus relationship between the primary camera and the subordinate camera based at least in part on the first set of position data and the second set of position data. As discussed in further detail below with reference to FIGS. 7-11, in various embodiments, the focus relationship may be approximated as linear. The nominal slope of the focus relationship may be based at least in part on a focal length of the subordinate camera and a focal length of the primary camera. For instance, the nominal slope of the focus relationship may be based at least in part on a ratio of the focal length of the subordinate camera to the focal length of the primary camera. In various examples, the nominal slope of the focus relationship may be equal to the square of the ratio of the focal lengths. Furthermore, as discussed in further detail below with reference to FIGS. 6 and 8-11, the focus relationship may include an offset term (also referred to herein as an "offset" or a "y-intercept"). The offset term may be the y-intercept of the linear relationship characterized by the focus relationship. The offset term may change from time to time based on one or more parameters associated with the primary camera and/or the subordinate camera. In some instances, the focus relationship may be updated to account for a change in the parameter(s) that causes a change in the offset term of the focus relationship.

In some examples, the method 300 of determining the focus relationship may be performed during a calibration at a location of a manufacturer of the primary camera and/or the subordinate camera, and/or at a location of a manufacturer of a product (e.g., a mobile multifunction device) that includes the primary camera and the subordinate camera. Additionally or alternatively, the method 300 may be performed at some point after the primary camera and the subordinate camera have reached the hands of a user (e.g., a user of a product that includes the primary camera and the subordinate camera).

Figure 4:
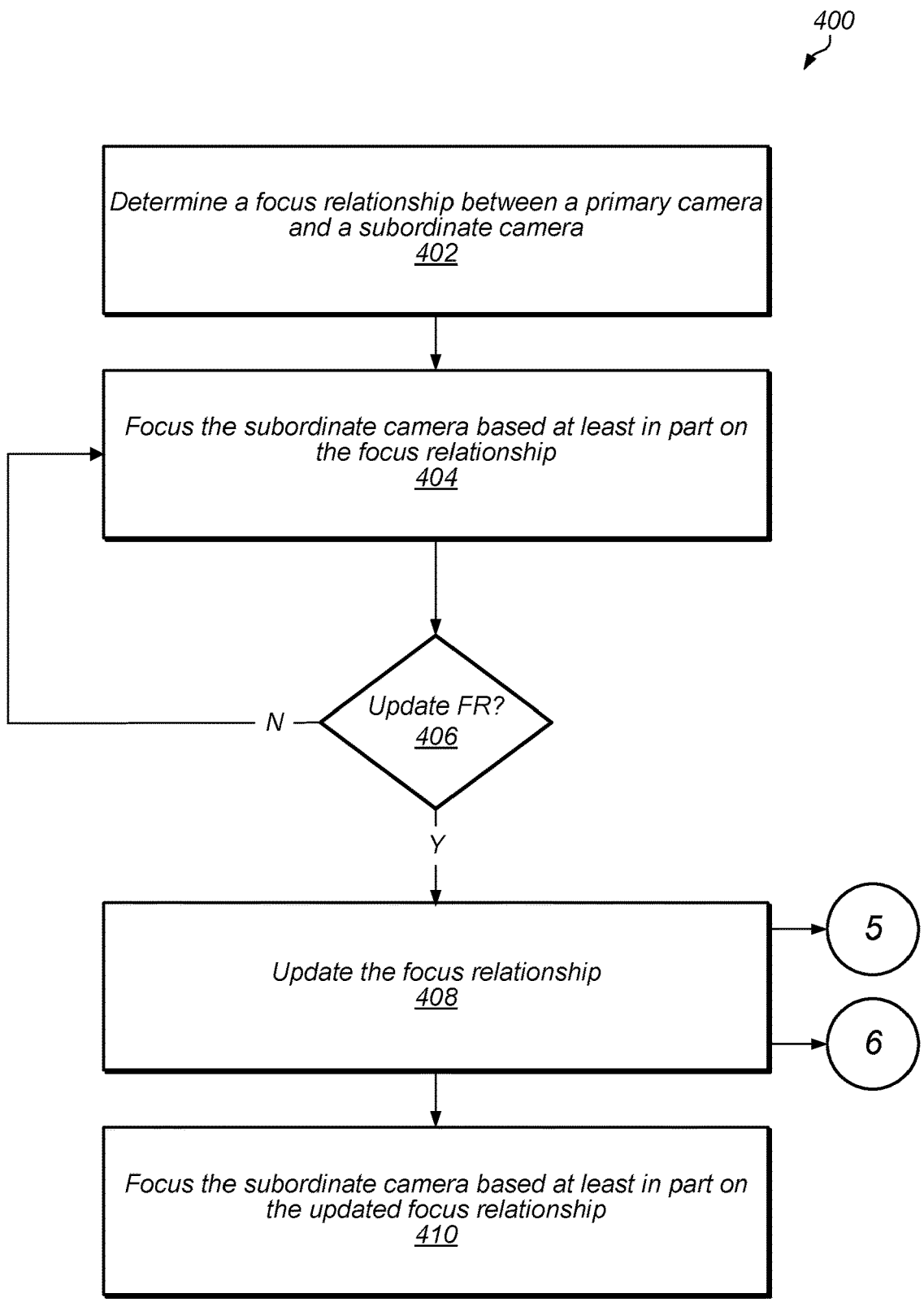
FIG. 4 is a flowchart of an example method of updating a focus relationship between a primary camera and a subordinate camera, in accordance with some embodiments.

FIG. 4 is a flowchart of an example method 400 of updating a focus relationship between a primary camera (e.g., the primary camera unit 102 described above with reference to FIG. 1) and a subordinate camera (e.g., the subordinate camera unit 104 described above with reference to FIG. 1), in accordance with some embodiments.

At 402, the method 400 may include determining a focus relationship between the primary camera and the subordinate camera. For instance, the focus relationship may be determined using the method 300 described above with reference to FIG. 3.

At 404, the method 400 may include focusing the subordinate camera based at least in part on the focus relationship. For instance, the subordinate camera lens may be moved to a focus position that is determined based at least in part on the focus relationship. In various examples, the subordinate camera may include an actuator to move the subordinate camera lens along the optical axis and/or along a plane that is orthogonal to the optical axis. In some examples, the actuator may be a voice coil motor (VCM) actuator, e.g., as illustrated below with reference to FIG. 12. A controller may be used to determine the focus position of the subordinate camera lens based at least in part on the focus relationship, and cause a current to be supplied to one or more coils of the VCM actuator based on the determined focus position. The current may cause the coils to magnetically interact with one or more actuator magnets of the VCM actuator to produce Lorentz forces that cause the coils or the actuator magnets to move. In some cases, the coils or the actuator magnets are coupled (e.g., at least partly via a lens holder) to the subordinate camera lens such that the subordinate camera lens moves along with the coils or the actuator magnets. Thus, the supplied current may cause the subordinate camera lens to move to the determined focus position via movement of the coils or the actuator magnets.

In some examples, the controller may drive the primary camera lens focus position with a first drive current, and drive the subordinate camera lens focus position with a second drive current that is based on the first drive current and the focus relationship. For instance, in some cases, the controller may not use feedback (e.g., position sensor feedback corresponding to the primary camera lens focus position) to drive the subordinate camera lens focus position. In some embodiments, the drive current supplied to the primary camera and/or the subordinate camera may be compensated for gravity.

At 406, the method 400 may include determining whether to update the focus relationship. In some examples, the determination of whether to update the focus relationship may be based at least in part on a period of time that has expired. For instance, a camera system (e.g., the camera system 100 described above with reference to FIG. 1) that includes the primary camera and the subordinate camera may be configured to update the focus relationship periodically. In some non-limiting examples, the camera system may be configured to update the focus relationship minute by minute, hourly, daily, weekly, monthly, and/or yearly. Additionally, or alternatively, the camera system may allow a user to input a desired time for updating the focus relationship and/or a desired frequency for updating the focus relationship.

In various implementations, the camera system may determine to update the focus relationship based at least in part on an operational state of the primary camera and/or the subordinate camera. For instance, the camera system may detect that the primary camera and/or the subordinate camera are currently not in use, or otherwise determine that the primary camera and/or the subordinate camera will likely not be used within a certain time period. The camera system may determine to update the focus relationship during such instances and/or during other instances determined to be good opportunities for updating the focus relationship without significantly negatively impacting user experience. In some cases, the camera system may determine to update the focus relationship after a user takes a picture using the camera system.

In some implementations, the camera system may determine to update the focus relationship based at least in part on a confidence level of the focus relationship. As discussed in further detail below with reference to FIGS. 5 and 11, the camera system may be configured to calculate a confidence level of the focus relationship. The camera system may compare the calculated confidence level to a threshold confidence level. The camera system may determine to update the focus relationship at least partly responsive to determining that the calculated confidence level satisfies the threshold confidence level.

If, at 406, it is determined to update the focus relationship, then the method 400 may include updating the focus relationship, at 408. For example, the focus relationship may be updated using the method 300 described above with reference to FIG. 3 and/or the method 500 described below with reference to FIG. 5. If, at 406, it is determined to not update the focus relationship, then the method 400 may include continuing to focus the subordinate camera based at least in part on the current focus relationship, at 404.

Figure 5:
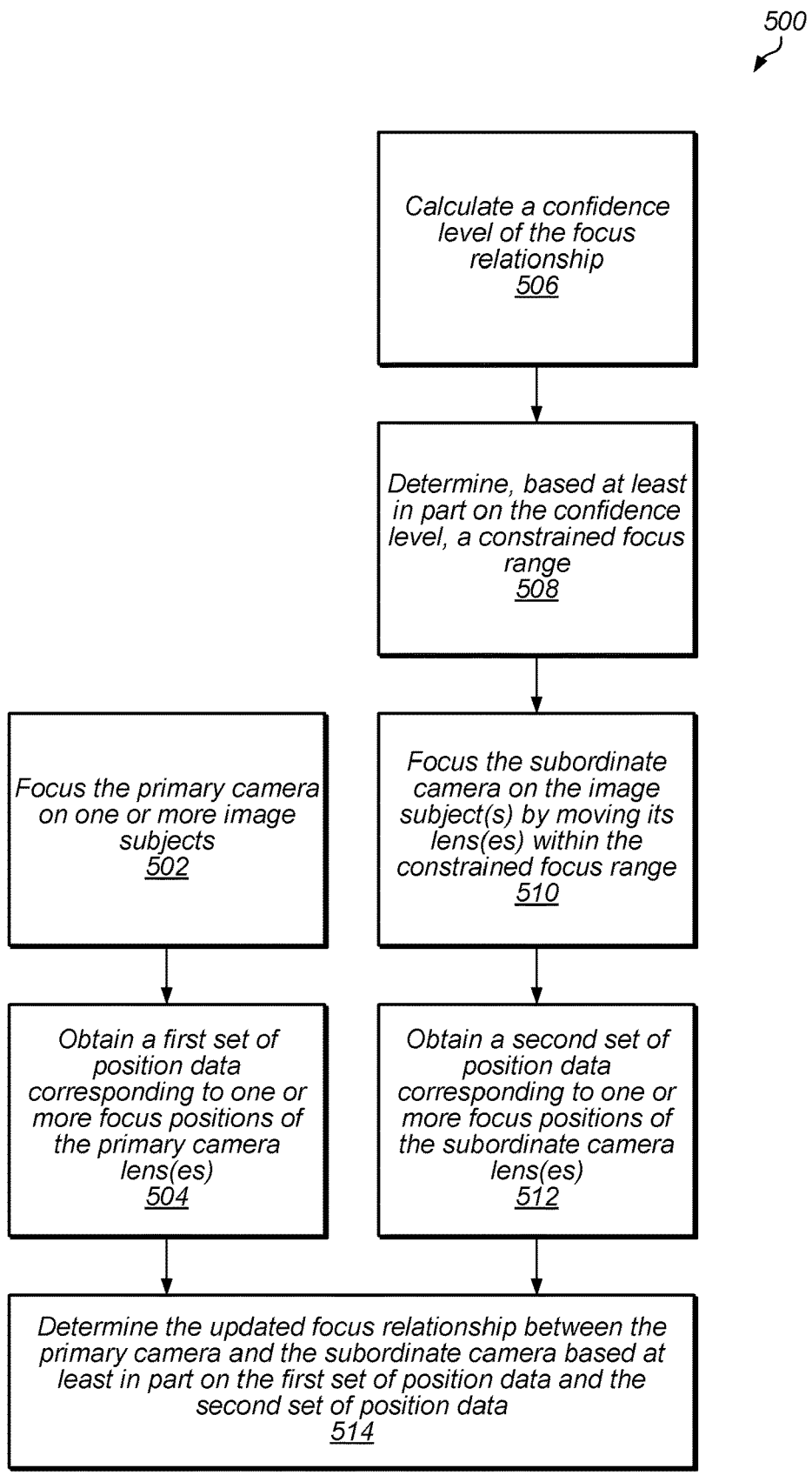
FIG. 5 is a flowchart of an example method of determining an updated focus relationship between a primary camera and a subordinate camera, in accordance with some embodiments. The example method of FIG. 5, the subordinate camera may be focused based on a constrained focus range, in accordance with some embodiments.

FIG. 5 is a flowchart of an example method 500 of determining an updated focus relationship between a primary camera (e.g., the primary camera unit 102 described above with reference to FIG. 1) and a subordinate camera (e.g., the subordinate camera unit 104 described above with reference to FIG. 1), in accordance with some embodiments. At 502, the method 500 may include focusing the primary camera on at least one image subject. At 504, the method 500 may include obtaining a first set of position data corresponding to one or more focus positions of the primary camera lens, e.g., as described above with reference to FIG. 3.

At 506, the method 500 may include calculating a confidence level of the focus relationship. At 508, the method 500 may include determining a constrained focus range for the subordinate camera. For instance, the constrained focus range may be determined based at least in part on the confidence level of the focus relationship. At 510, the method 500 may include focusing the subordinate camera on the image subject. For instance, subordinate camera may be focused on the image subject by moving the subordinate camera lens within the constrained focus range. At 512, the method 500 may include obtaining a second set of position data corresponding to one or more focus positions of the subordinate camera lens, e.g., as described above with reference to FIG. 3.

At 514, the method 500 may include determining the second focus relationship between the primary camera and the subordinate camera based at least in part on the first set of position data and the second set of position data. As discussed in further detail below with reference to FIGS. 7-11, in various embodiments, the focus relationship may be approximated as linear. The nominal slope of the second focus relationship may be based at least in part on a focal length of the subordinate camera and a focal length of the primary camera. For instance, the nominal slope of the second focus relationship may be based at least in part on a ratio of the focal length of the subordinate camera to the focal length of the primary camera. In various examples, the nominal slope of the second focus relationship may be equal to the square of the ratio of the focal lengths. Furthermore, as discussed in further detail below with reference to FIGS. 6 and 8-11, the focus relationship may include an offset term. The offset term may be the y-intercept of the linear relationship characterized by the second focus relationship. The offset term may change from time to time based on one or more parameters associated with the primary camera and/or the subordinate camera.

Figure 6:
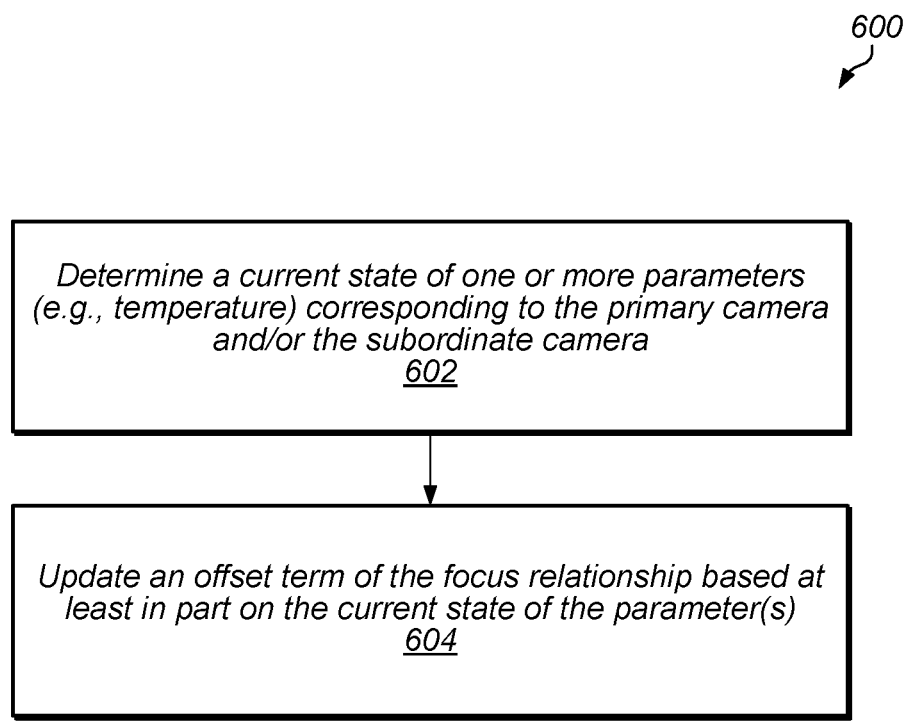
FIG. 6 is a flowchart of an example method of updating an offset term of a focus relationship, in accordance with some embodiments.

FIG. 6 is a flowchart of an example method 600 of updating an offset term of a focus relationship, in accordance with some embodiments. For instance, the method 600 may be performed as part of updating a focus relationship, as described above with reference to FIG. 4 (e.g., at block 408). The first offset term may be a part of the focus relationship that is variable based at least in part on one or more parameters corresponding to the primary camera and/or the subordinate camera.

At 602, the method 600 may include determining a current state of one or more parameters corresponding to the primary camera and/or the subordinate camera. For instance, the parameters may be parameters that affect focus positioning of the primary camera lens and/or the subordinate camera lens, e.g., by causing effective focal length (EFL) variation. For example, the parameters may include temperature sensitivity, ambient magnetic fields, long-term EFL variation-causing factors (e.g., humidity), end stop compression in drop events, etc.

In some examples, the parameters may include a first temperature associated with the primary camera lens and a second temperature associated with the subordinate camera lens. The current state of the first temperature and the first state of the second temperature may be obtained, for example, via temperature measurements produced by temperature sensors disposed at or near the primary camera lens and the subordinate camera lens. In some examples, a first temperature sensor may be disposed such that it measures a temperature of a first component disposed near the primary lens. The temperature of the first component may be used as an approximation of the temperature of the primary lens. Similarly, a second temperature sensor may be disposed such that it measures a temperature of a second component disposed near the subordinate lens. The temperature of the second component may be used as an approximation of the temperature of the subordinate lens. As lens temperatures may change during operation of the primary camera and the subordinate camera, the offset term of the focus relationship may also change.

At 604, the method 600 may include updating the offset term of the focus relationship based at least in part on the current state of the parameters corresponding to the primary camera and/or the subordinate camera. For instance, the offset term may be updated based at least in part on the current state of the first temperature associated with the primary camera lens and the current state of the second temperature associated with the subordinate camera lens. As discussed in further detail below with reference to FIGS. 9 and 10, temperature measurements may be used for determining and/or updating the focus relationship between the primary camera and the subordinate camera based at least in part on practical focal length (PFL) temperature compensation.

Figure 7:
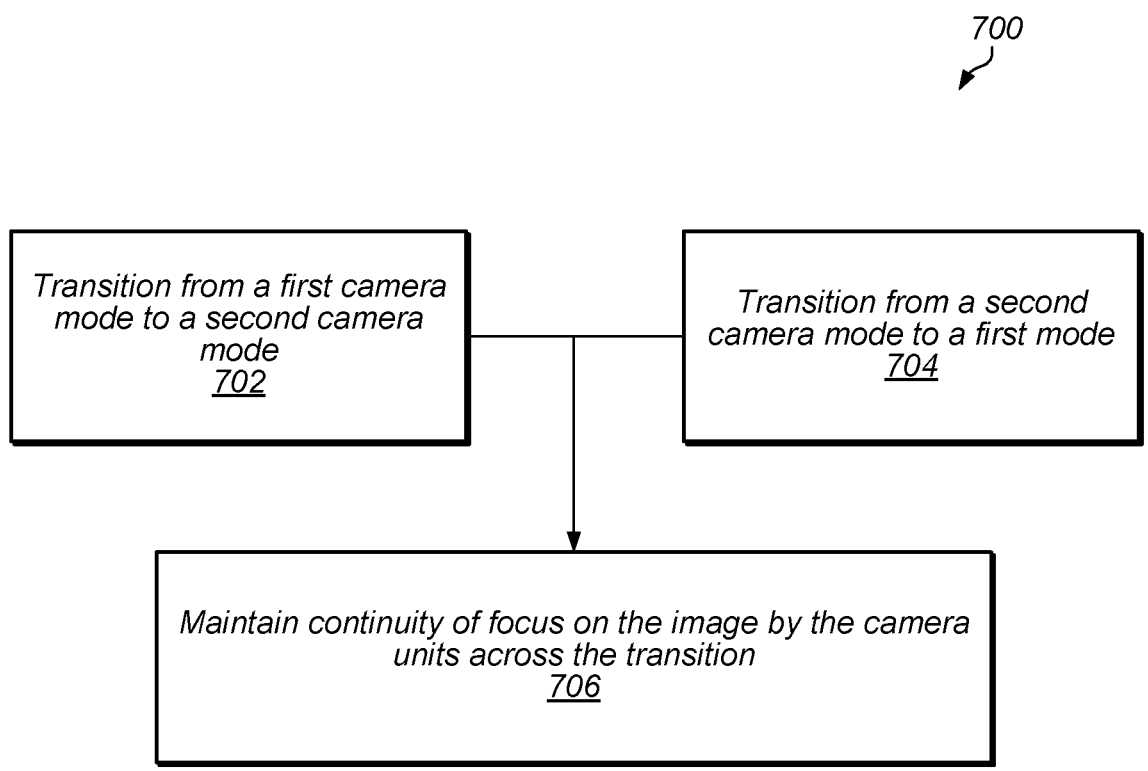
FIG. 7 is a flowchart of an example method of maintaining focus continuity across a transition from one camera mode to another camera mode, in accordance with some embodiments.

FIG. 7 is a flowchart of an example method 700 of maintaining focus continuity across a transition from one camera mode to another camera mode, in accordance with some embodiments. At 702, the method 700 may include transitioning from a first camera mode to a second camera mode. Additionally, or alternatively, at 704, the method 700 may include transitioning from the second camera mode to the first camera mode.

In the first camera mode, a first camera unit (e.g., the primary camera unit 102 described above with reference to FIG. 1) may be designated as a primary camera for focusing, and a second camera unit (e.g., the subordinate camera unit 104 described above with reference to FIG. 1) may be designated as a subordinate camera for focusing. In the second camera mode, the second camera unit may be designated as the primary camera for focusing, and the first camera unit may be designated as the subordinate camera for focusing. That is, the first camera unit and the second camera unit may switch primary-subordinate roles from time to time. For instance, in some examples, the first camera unit and the second camera unit may switch primary-subordinate roles based at least in part on camera settings information and/or ambient conditions information (e.g., ambient lighting information). Additionally, or alternatively, a controller may determine to switch the primary-subordinate roles of the first camera unit and the second camera unit based at least in part on a respective camera lens type and/or a respective distance to a particular image subject. According to some embodiments, across transitioning from the first camera mode to the second camera mode and/or across transitioning from the second camera mode to the first camera mode, the primary camera (i.e., the camera unit designated as the primary camera) may be focused on an image subject based at least in part on image content corresponding to the image subject. Moreover, across such transitions, the subordinate camera (i.e., the camera unit designated as the subordinate camera may be focused on the image subject based at least in part on a focus relationship between the first camera unit and the second camera unit.

At 706, the method 700 may include maintaining continuity of focus on the image subject by the primary camera and the subordinate camera across the transition from the first camera mode to the second camera mode and/or across the transition from the second camera mode to the first camera mode. For instance, such continuity of focus across transitions may be maintained by focusing the subordinate camera based at least in part on a focus relationship between the subordinate camera and the primary camera, as further described above and below with reference to FIGS. 1-6 and 8A-12. In some cases, the focus relationship may be adjusted for a switch in the primary-subordinate roles of the first camera unit and the second camera unit. For instance, a first focus relationship may be used when the first camera unit is designated as the primary camera and the second camera unit is designated as the subordinate camera. A second focus relationship, which may correspond to an adjustment to the first focus relationship, may be used when the second camera unit is the primary camera and the first camera unit is the subordinate camera. In some instances, the first focus relationship and the second focus relationship may be determined before a switch in primary-subordinate roles occurs. In other instances, an adjustment to a focus relationship to account for a switch in primary-subordinate roles may occur on-the-fly during a time period in which the switch occurs.

Figure 8A:
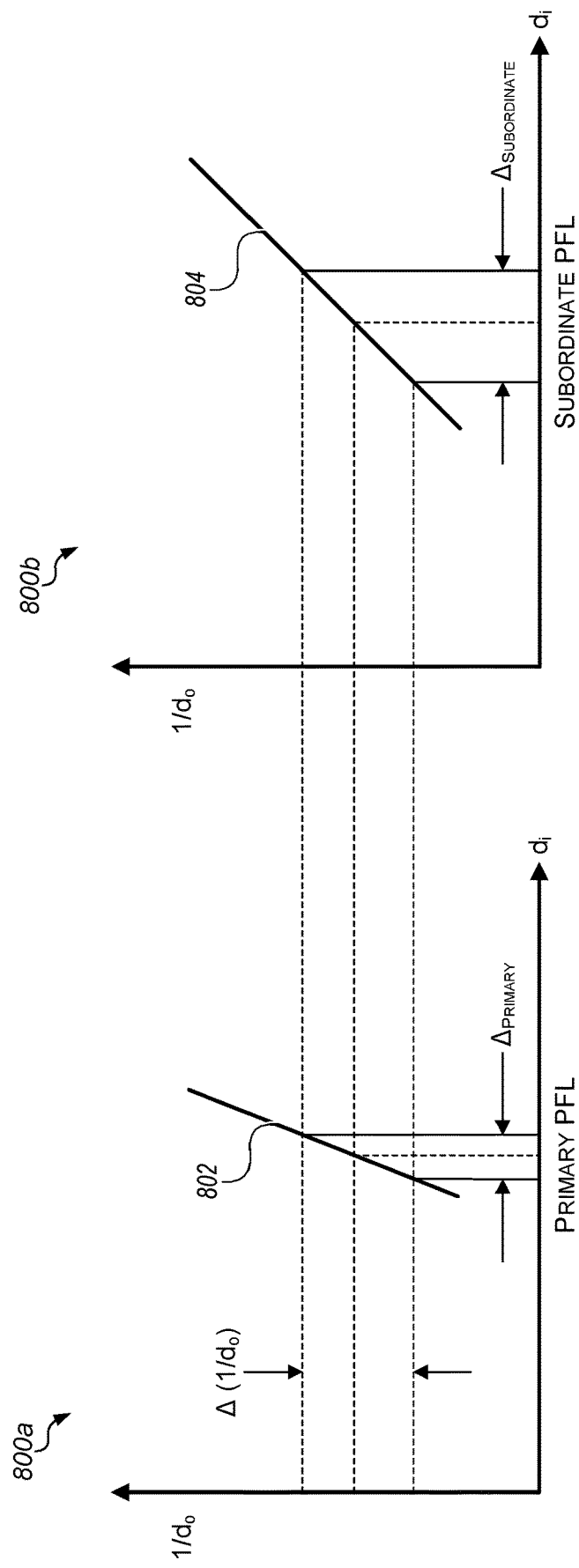
FIGS. 8A-8B illustrate, via graphs, example characteristics of a focus relationship between positioning of a primary camera and positioning of a subordinate camera lens, in accordance with some embodiments.
Figure 8B:
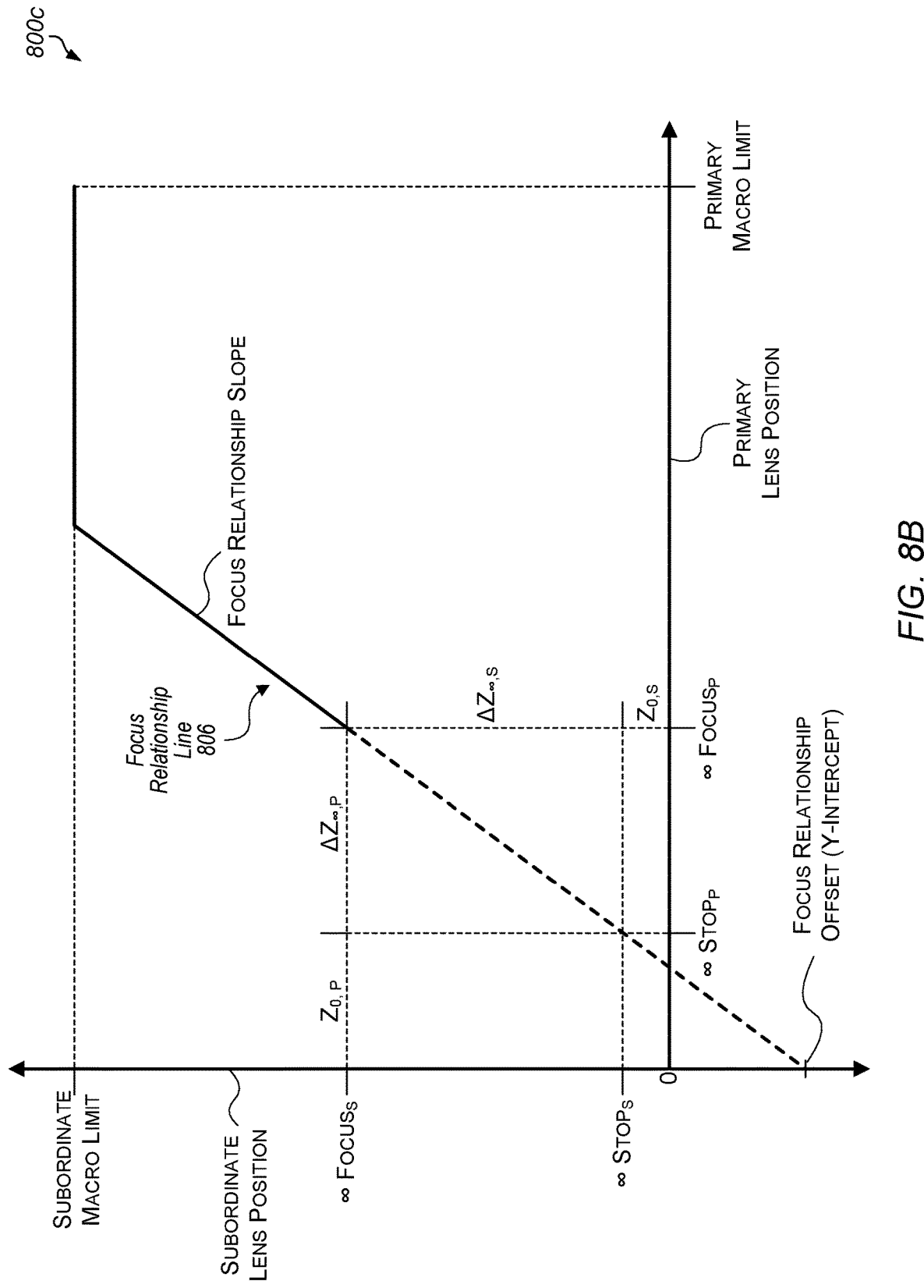

FIGS. 8A-8B illustrate, via graphs 800a-800c, example characteristics of a focus relationship between positioning of a primary camera lens (e.g., the primary camera lens 106 of the primary camera unit 102 illustrated in FIG. 1) and positioning of a subordinate camera lens (e.g., the subordinate camera lens 110 of the subordinate camera unit 104 illustrated in FIG. 1), in accordance with some embodiments. For example, the focus relationship illustrated in the graphs of FIGS. 8A-8B may include a relationship between the primary camera lens and subordinate camera lens focus positions when both cameras are in focus on a same object and at the same distance. In FIG. 8A, the left-side graph 800a provides an example of positioning of the primary camera lens, and the right-side graph 800b provides an example of positioning of the subordinate camera lens. In FIG. 8B, the graph 800c provides an example of a focus relationship line with respect to the primary camera lens position and the subordinate camera lens position.

In the left-side graph 800a of FIG. 8A, the vertical axis, labeled "$1/d_o$", represents an inverse of the distance from the primary camera lens to the object (or image subject). The horizontal axis, labeled "$d_i$", represents a distance from the primary camera lens to an image sensor of the primary camera. Moreover, the horizontal axis may represent a practical focal length (PFL) of the primary camera. In various embodiments, the PFL of the primary camera may be determined based at least in part on measurements from one or more position sensors (e.g., the position sensors 1208 described below with reference to FIG. 12). The graph 800a indicates, via line 802, that there is a linear relationship between the change in the PFL of the primary camera (or a change in $d_i$), denoted as $\Delta_{Primary}$, and a change in $1/d_o$, denoted as $\Delta(1/d_o)$. In some embodiments, the slope of the line 802 may be characterized as:

$$m_{Primary} \approx \frac{1}{EFL_{Primary}^2},$$

where:

$m_{Primary}$ is the slope of the line 802, and $EFL_{Primary}$ is the effective focal length of primary camera lens.

In the right-side graph 800b of FIG. 8A, the vertical axis, labeled "$1/d_o$", represents an inverse of the distance from the subordinate camera lens to the object (or image subject). The horizontal axis, labeled "$d_i$", represents a distance from the subordinate camera lens to an image sensor of the subordinate camera. Moreover, the horizontal axis may represent a practical focal length (PFL) of the subordinate camera. In various embodiments, the PFL of the subordinate camera may be determined based at least in part on measurements from one or more position sensors (e.g., the position sensors 1208 described below with reference to FIG. 12). The graph 800b indicates, via line 804, that there is a linear relationship between the change in the PFL of the subordinate camera (or a change in $d_i$), denoted as "$\Delta_{Subordinate}$", and a change in $1/d_o$, denoted as "$\Delta(1/d_o)$". In some embodiments, the slope of the line 804 may be characterized as follows:

$$m_{Subordinate} \approx \frac{1}{EFL_{Subordinate}^2},$$

where:

$m_{Subordinate}$ is the slope of the line 804, and $EFL_{Subordinate}$ is the effective focal length of subordinate camera lens.

Furthermore, the relationship between $\Delta_{Subordinate}$ and $\Delta_{Primary}$ may be characterized as follows:

$$\Delta_{Subordinate} \approx \Delta_{Primary} \left( \frac{EFL_{Subordinate}}{EFL_{Primary}} \right)^2,$$

In the graph 800c of FIG. 8B, the vertical axis represents the subordinate camera lens position and the vertical axis represents the primary camera lens position. The graph indicates, via a focus relationship line 806, that there is a linear relationship between focus positioning of the subordinate camera lens and focus positioning of the primary camera lens. In some examples, the focus relationship can be approximated as linear due to the lens travel range being small compared to the focal length of each camera. Furthermore, in some cases, the errors associated with the linear approximation may be very small. For instance, in some cases the errors associated with the linear approximation may be less than 1 micrometer over the travel ranges of the primary camera lens and the subordinate camera lens, which may be smaller than the uncertainty in some conventional autofocus techniques.

The nominal slope of the focus relationship line 806 may be based at least in part on a focal length of the subordinate camera lens and a focal length of the primary camera lens. For instance, the nominal slope of the focus relationship line 806 may be based at least in part on a ratio of the focal length of the subordinate camera lens to the focal length of the primary camera lens. In various examples, the nominal slope of the focus relationship may be equal to the square of the ratio of the focal lengths, for example, characterized as follows:

$$m_{Focus\ Relationship} = \left( \frac{EFL_{Subordinate}}{EFL_{Primary}} \right)^2,$$

where $m_{Focus\ Relationship}$ is the slope of the focus relationship line 806.

The graph 800c of FIG. 8B indicates, along the vertical axis, an infinity end stop position of the subordinate camera lens, denoted as "$\infty\ Stop_S$", and an infinity focus position of the subordinate camera lens, denoted as "$\infty\ Focus_S$". In addition, the graph 800c indicates, along the vertical axis, a macro focus limit of the subordinate camera lens. Similarly, the graph 800c indicates, along the horizontal axis, an infinity end stop position of the primary camera lens, denoted as "$\infty\ Stop_P$", and an infinity focus position of the primary camera lens, denoted as "$\infty\ Focus_P$". In addition, the graph 800c indicates, along the horizontal axis, a macro focus limit of the primary camera lens. In some embodiments, the primary camera may be a wide angle lens camera and the subordinate camera may be a telephoto camera. However, in other embodiments, the primary camera may be a telephoto lens camera or any other type of camera, and the subordinate camera may be a wide angle lens camera or any other type of camera.

The graph 800c indicates a distance, denoted as "$Z_{0,P}$", between the zero position of the primary camera lens and the infinity end stop position of the primary camera lens ($\infty\ Stop_P$). Furthermore, the graph 800c indicates a distance, denoted as "$\Delta Z\infty_{,P}$", between the infinity end stop position of the primary camera lens ($\infty\ Stop_P$) and the infinity focus position of the primary camera ($\infty\ Focus_P$) lens.

Similarly, the graph 800c indicates a distance, denoted as "$Z_{0,S}$", between the zero position of the subordinate camera lens and the infinity end stop position of the primary camera lens ($\infty\ Stop_P$). Furthermore, the graph 800c indicates a distance, denoted as "$\Delta Z\infty_{,S}$", between the infinity end stop position of the subordinate camera lens ($\infty\ Stop_S$) and the infinity focus position of the subordinate camera lens ($\infty\ Focus_S$).

The y-intercept of the focus relationship line 806 may represent an offset term (e.g., the offset term described above with reference to FIGS. 3, 5, and 6) of the focus relationship. The offset term may change from time to time based on one or more parameters associated with the primary camera and/or the subordinate camera. In some instances, the focus relationship may be updated to account for a change in the parameter(s) that causes a change in the offset term of the focus relationship.

In some embodiments, the y-intercept of the focus relationship line 806 may be determined based at least in part on distances between the infinity focus positions and the infinity end stops, focus position offsets, and/or a ratio of focal lengths. In some examples, the y-intercept of the focus relationship line 806 may be characterized as follows:

$$y\ intercept = (\Delta z_{\infty,S} + \Delta z_{0,S}) - (\Delta z_{\infty,P} + \Delta z_{0,P}) \times \left( \frac{EFL_S}{EFL_P} \right)^2.$$

The y-intercept position may depend on infinity end stop to infinity focus spacing at a reference temperature, and may vary, e.g., based at least in part on temperature sensitivity of the primary camera lens and/or the subordinate camera lens.

Figure 9:
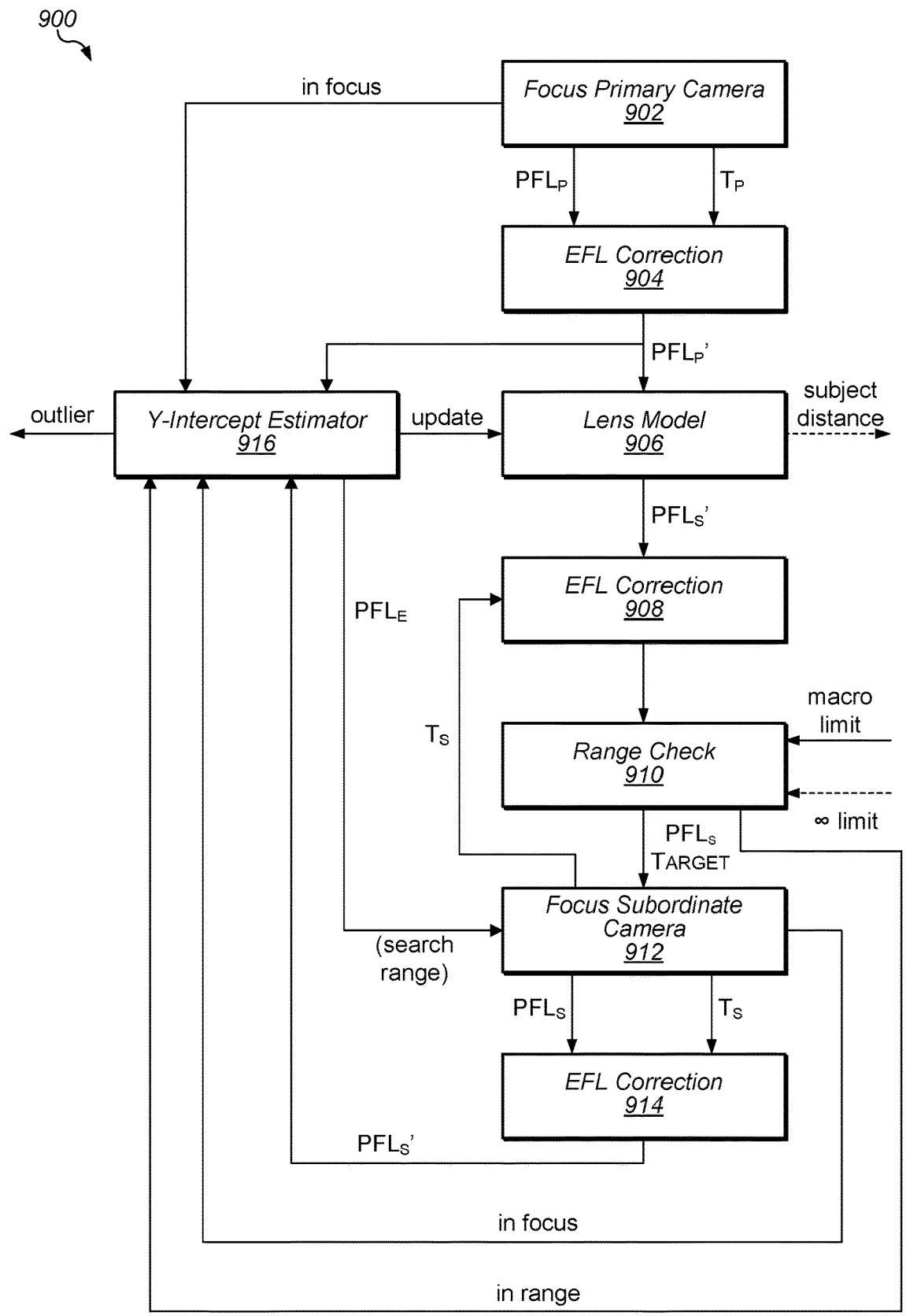
FIG. 9 is a flow block diagram of an example method of focusing a subordinate camera using an adaptive lens model that is based on a focus relationship between the subordinate camera and a primary camera, in accordance with some embodiments.

FIG. 9 is a block diagram of an example method 900 of focusing a subordinate camera (e.g., the subordinate camera unit 104 described above with reference to FIG. 1) using an adaptive lens model that is based on a focus relationship between the subordinate camera and a primary camera (e.g., the primary camera unit 102 described above with reference to FIG. 1), in accordance with some embodiments. In the example method 900, a y-intercept estimator (e.g., the estimator 1100 described below with reference to FIG. 11) may be used to update the adaptive lens model.

At 902, the method 900 may include focusing the primary camera on an image subject. In some examples, the primary camera unit may be focused on the image subject based at least in part on image content corresponding to the image subject. For instance, focusing of the primary camera unit on the image subject may include adjusting the position of the primary camera lens based at least in part on one or more metrics (e.g., sharpness, contrast, etc.). In a non-limiting example, the position of the primary camera lens may be adjusted to satisfy a threshold image metric (e.g., a threshold sharpness, a threshold contrast, etc.) that indicates that the primary camera unit is focused on the image subject. Additionally or alternatively, the primary camera unit may be focused on the image subject based at least in part on one or more autofocus techniques (e.g., phase detection, contrast detection, laser autofocus, etc.). In some instances, the primary camera may use focus pixels to maintain sharp focus in bright light. Furthermore, in some instances, the primary camera may search for a focus position using a contrast metric when focusing in low light. One or more position sensors (e.g., the position sensors 1208 described below with reference to FIG. 12) may be used to determine the primary camera lens position, which corresponds to a practical focal length (PFL) of the primary camera lens (denoted in FIG. 9 as "$PFL_P$").

In some embodiments, a temperature of the primary camera lens (denoted in FIG. 9 as "$T_P$") may be obtained during a time period in which the primary camera is focused on the image subject. In some examples, the temperature of the primary camera lens may be approximated as a temperature of another component of the primary camera that is near the primary camera lens. Additionally, or alternatively, the temperature of the primary camera lens may be inferred based at least in part on a voice coil motor (VCM) actuator current and a thermal model. Additionally, or alternatively, the temperature of the primary camera lens may be derived from the VCM actuator coil resistance.

At 904, the method 900 may include performing an effective focal length (EFL) correction to account for changes in one or more parameters associated with the primary camera lens and/or the primary camera. For instance, the EFL correction may include correcting for a variation in the temperature of the primary camera lens, as further described below with reference to FIG. 10. In some examples, the EFL correction may produce a temperature-corrected position of the primary camera lens based at least in part on the $PFL_P$ and the $T_P$, which corresponds to a corrected/updated PFL of the primary camera lens (denoted in FIG. 9 as "$PFL_P'$").

At 906, the method 900 may include using the lens model to calculate, based at least in part on the focus relationship between the primary camera and the subordinate camera, a corrected position of the subordinate camera lens that corresponds to the same distance to the image subject. The corrected position of the subordinate camera lens may correspond to a corrected PFL of the subordinate camera lens (denoted in FIG. 9 as "$PFL_S'$"). The lens model may be updated from time to time based at least in part on y-intercept estimates provided by the y-intercept estimator.

At 908, the method 900 may include performing an EFL correction to account for changes in one or more parameters associated with the subordinate camera lens and/or the subordinate camera. For instance, the EFL correction may include correcting for a variation in the temperature of the subordinate camera lens, as further described below with reference to FIG. 10. In some examples, the EFL correction may produce a temperature-corrected position of the subordinate camera lens based at least in part on the $PFL_S'$ and a temperature of the subordinate camera lens (denoted in FIG. 9 as "$T_S$"), which corresponds to a target PFL of the subordinate camera lens (denoted in FIG. 9 as "$PFL_S$ Target").

At 910, the method 900 may include checking the target PFL of the subordinate camera against a focus range of the subordinate camera. For instance, the subordinate camera may have a macro focus limit and an infinity limit that define upper and lower bounds of the focus range of the subordinate camera, and the method 900 may include checking whether the target PFL of the subordinate camera is within the focus range. In some embodiments, the y-intercept estimator may estimate the y-intercept of the focus relationship based at least in part on focus positions of the subordinate camera lens. When the target PFL of the subordinate camera lens falls outside the focus range, the y-intercept estimator may not use the corresponding position coordinates to update the focus relationship as the subordinate camera may not be in focus.

At 912, the method 900 may include focusing the subordinate camera on the same image subject as the primary camera. In some examples, the subordinate camera unit may be focused on the image subject based at least in part on image content corresponding to the image subject. For instance, focusing of the subordinate camera unit on the image subject may include adjusting the position of the subordinate camera lens based at least in part on one or more metrics (e.g., sharpness, contrast, etc.). In a non-limiting example, the position of the subordinate camera lens may be adjusted to satisfy a threshold image metric (e.g., a threshold sharpness, a threshold contrast, etc.) that indicates that the subordinate camera unit is focused on the image subject. Additionally or alternatively, the subordinate camera unit may be focused on the image subject based at least in part on one or more autofocus techniques (e.g., phase detection, contrast detection, laser autofocus, etc.). In some instances, the subordinate camera may use focus pixels to maintain sharp focus in bright light. Furthermore, in some instances, the subordinate camera may search for a focus position using a contrast metric when focusing in low light. One or more position sensors (e.g., the position sensors 1208 described below with reference to FIG. 12) may be used to determine the subordinate camera lens position, which corresponds to a PFL of the subordinate camera lens (denoted in FIG. 9 as "$PFL_S$").

Additionally, or alternatively, the y-intercept estimator may provide a search range within which to search for a focus position of the subordinate camera lens. For instance, the search range may correspond to a constrained search within a subset of the focus range. In some examples, the y-intercept estimator may determine the search range based at least in part on a confidence level of the focus relationship. In cases where a constrained search is performed, the time to achieve the focus position of the subordinate camera lens may be reduced as compared to some conventional focus techniques that involve searching for a focus position within the whole focus range.

In some embodiments, the subordinate camera may be focused on the image subject based at least in part on the focus relationship between the subordinate camera and the primary camera. For instance, the subordinate camera may track the target PFL of the subordinate camera lens ($PFL_S$ Target) without searching for a focus position based on image content associated with the image subject.

Furthermore, at 912, a temperature of the subordinate camera lens ($T_S$) may be obtained during a time period in which the subordinate camera is focused on the image subject. The temperature of the subordinate camera lens may be used, e.g., in the EFL correction performed at 908 and/or in the EFL correction performed at 914.

At 914, the method 900 may include performing an EFL correction to account for changes in one or more parameters associated with the subordinate camera lens and/or the subordinate camera. For instance, the EFL correction may include correcting for a variation in the temperature of the subordinate camera lens, as further described below with reference to FIG. 10. In some examples, the EFL correction may produce a temperature-corrected position of the subordinate camera lens based at least in part on the $PFL_S$ and the $T_S$, which corresponds to a corrected/updated PFL of the subordinate camera lens (denoted in FIG. 9 as "$PFL_S'$").

At 916, the method 900 may include estimating, by the y-intercept estimator, the y-intercept (also referred to herein as an "offset term") of the focus relationship. The y-intercept estimator may estimate the y-intercept based on one or more inputs. For instance, the corrected PFL of the primary camera lens ($PFL_P'$) and the corrected PFL of the subordinate camera lens ($PFL_S'$) may be provided as inputs to the y-intercept estimator. Accordingly, the y-intercept estimator may estimate the y-intercept based at least in part on the $PFL_P'$ and the $PFL_S'$. Furthermore, the y-intercept estimator may receive, as inputs, information related to whether the primary camera and/or the subordinate camera are in focus. Moreover, the y-intercept estimator may receive, as an input, information related to the range check performed at 910 (e.g., whether the target PFL of the subordinate camera is within the focus range).

Outlier values that correspond to situations where the primary camera and the subordinate camera have focused on different image subjects may be flagged and may not be included in the y-intercept estimate calculated by the y-intercept estimator. Furthermore, values may also be rejected when the primary camera and/or the subordinate camera has not converged on focus (e.g., when focus peak is not found in a contrast focus method) and/or when the subordinate camera has been directed outside of its focus range.

Figure 10:
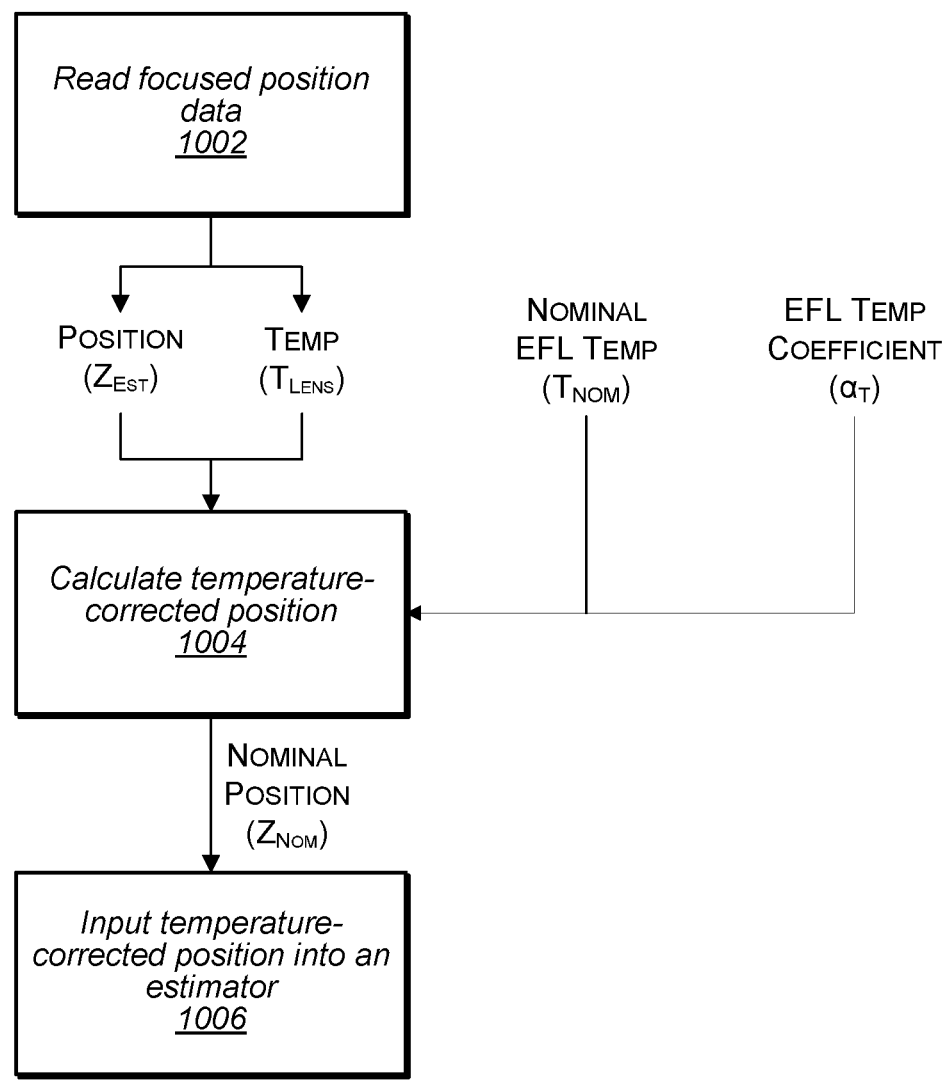
FIG. 10 is a block diagram of an example method of calculating a temperature-corrected position of a primary camera lens and/or a subordinate camera lens, in accordance with some embodiments.

FIG. 10 is a block diagram of an example method 1000 for calculating a temperature-corrected position of a primary camera lens (e.g., the primary camera lens 106 of the primary camera unit 102 described above with reference to FIG. 1) and/or a subordinate camera lens (e.g., the subordinate camera lens 110 of the subordinate camera unit 104 described above with reference to FIG. 1), in accordance with some embodiments. In some embodiments, the effective focal length (EFL) ratio used to determine the focus relationship between the primary camera and the subordinate camera may be based on the nominal EFLs recorded for each of the primary camera lens and the subordinate camera lens. These nominal EFLs may only be valid for the temperature at which the respective nominal EFL was measured due to a temperature dependence of the EFL. Furthermore, based at least in part on the Lens Maker's Formula and an offset relationship between a measured focus position of a lens and its PFL, a temperature dependence of a measured focus position of a lens may be characterized as follows:

$$Z_{nom} = Z_{est} - \alpha_T(T_{lens} - T_{nom}),$$

where:
$Z_{nom}$ is a temperature-corrected position of the lens,
$Z_{est}$ is a measured focus position of the lens,
$\alpha_T$ is an EFL temperature coefficient for the lens,
$T_{lens}$ is a temperature of the lens obtained during a time period in which the focus position of the lens is measured, and
$T_{nom}$ is a temperature of the lens at which the EFL of the lens was recorded.

At 1002, the method 1000 may include reading focused position data associated with a lens. The focused position data may include a focused position of the lens, $Z_{est}$, which may be measured using one or more position sensors (e.g., the position sensors 1208 described below with reference to FIG. 12). Furthermore, the focused position data may include a temperature of the lens obtained during a time period in which the focus position of the lens is measured, $T_{lens}$.

At 1004, the method 1000 may include calculating a temperature-corrected position of the lens, $Z_{nom}$. For instance, as noted above, the temperature-corrected position of the lens may be calculated using the following equation:

$$Z_{nom} = Z_{est} - \alpha_T(T_{lens} - T_{nom}).$$

At 1006, the method may include inputting the temperature-corrected position into an estimator (e.g., the y-intercept estimator described above with reference to FIG. 9 and/or the estimator 1100 described below with reference to FIG. 11).

Figure 11:
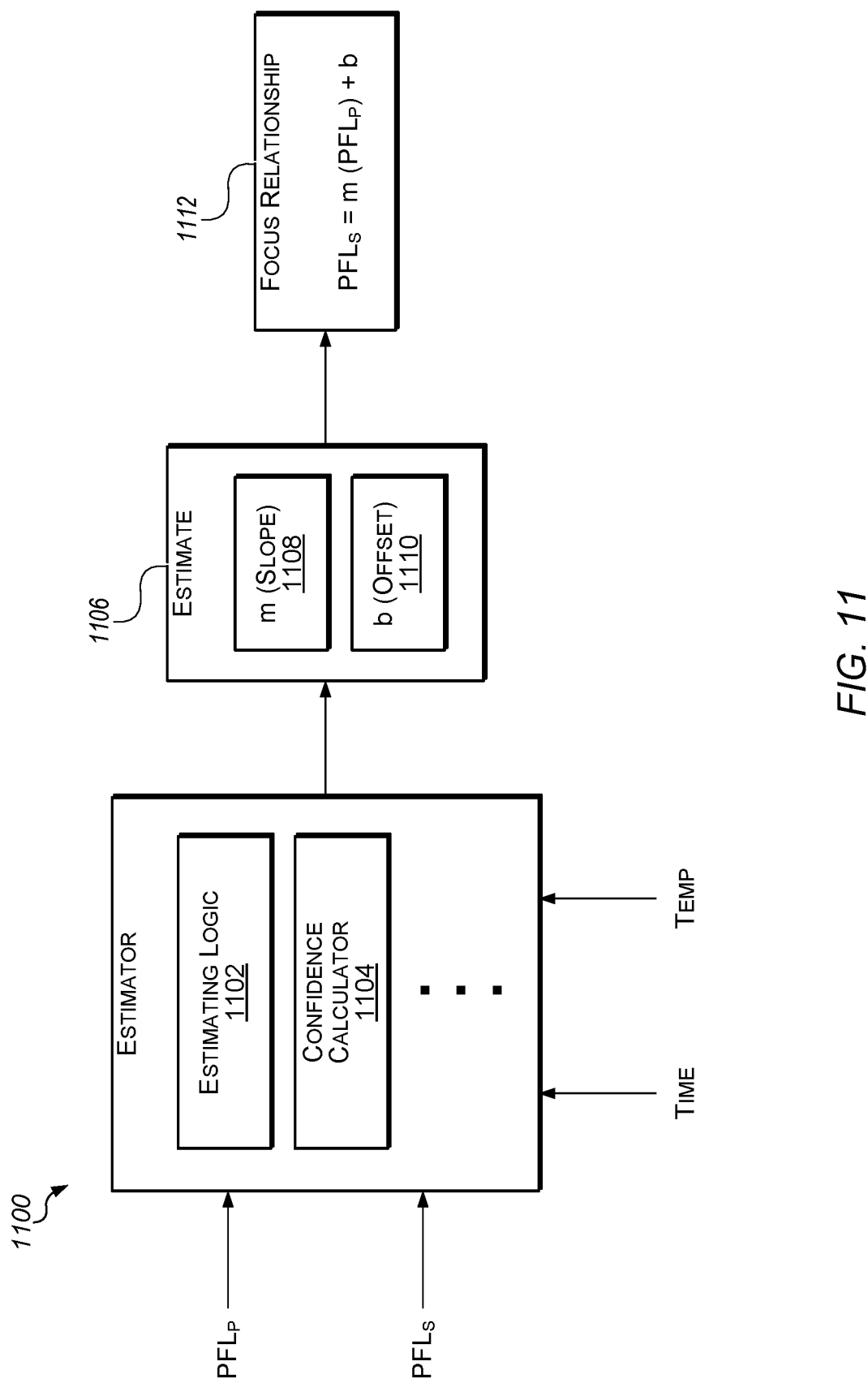
FIG. 11 is a block diagram of an example estimator for estimating a focus relationship between a primary camera and a subordinate camera, in accordance with some embodiments.

FIG. 11 is a block diagram of an example estimator 1100 for estimating a focus relationship between a primary camera (e.g., the primary camera unit 102 described above with reference to FIG. 1) and a subordinate camera (e.g., the subordinate camera unit 104 described above with reference to FIG. 1), in accordance with some embodiments.

In some embodiments the estimator 1100 may include estimating logic 1102 that may be used to determine, calculate, and/or estimate the focus relationship and/or the offset term (y-intercept) of the focus relationship in one or more of the embodiments described herein with reference to FIGS. 1-11, 13, and 14. Furthermore, in some examples, the estimator 1100 may include a confidence calculator 1104 for calculating one or more confidence levels of the focus relationship and/or the offset term of the focus relationship. Although the estimating logic 1102 and the confidence calculator 1104 are shown as separate blocks in FIG. 11, the confidence calculator 1104 may additionally or alternatively be included within the estimating logic 1102 and/or within one or more other components of the estimator 1102.

In various examples, the estimator 1100 may receive one or more inputs. For instance, the estimator 1100 may receive a practical focal length (PFL) of the primary camera (denoted in FIG. 11 as "$PFL_P$"), a PFL of the subordinate camera (denoted in FIG. 11 as (denoted in FIG. 11 as "$PFL_P$"), time information, and/or temperature information corresponding to the primary camera lens and/or the subordinate camera lens. The estimator 1100 may determine an estimate 1106 of the focus relationship based at least in part on the received inputs. For instance, the estimate 1106 may include an estimate of a slope (m) 1108 of the focus relationship and/or an estimate of an offset term (b) 1110 of the focus relationship. As a result of the estimate 1106, the focus relationship 1112 between the primary camera and the subordinate camera may be established. For instance, the focus relationship may relate the PFL of the subordinate camera lens (PFL$_S$) to the PFL of the primary camera lens (PFL$_P$) based on the estimated slope (m) 1108 and the estimated offset term (b) 1110, as follows:

$$PFL_S=m(PFL_P)+b.$$

The estimator 1100 may update the focus relationship 1112 from time to time. For instance, the estimator 1100 may update the focus relationship 1112 based at least in part on receiving one or more updated inputs.

FIG. 12 illustrates a schematic side view of an example camera module having an example voice coil motor (VCM) actuator 1200 for moving an optical package 1202, in accordance with some embodiments. In some embodiments, the example camera module may represent an example of a primary camera (e.g., one or more of the primary camera embodiments described above with reference to FIGS. 1-11) and/or an example of a subordinate camera (e.g., one or more of the subordinate camera embodiments described above with reference to FIGS. 1-11). However, it should be understood that the primary camera and/or the subordinate camera may include other camera architectures and/or actuator architectures. As shown in FIG. 12, the actuator 1200 may include a base or substrate 1204 and a cover 1206. The base 1204 may include and/or support one or more position sensors (e.g., Hall sensors, TMR sensors, GMR sensors, etc.) 1208, one or more optical image stabilization coils 1210, and one or more suspension wires 1212, which may at least partly enable magnetic sensing for autofocus and/or optical image stabilization position detection, e.g., by detecting movements of position sensor magnets 1214.

In some embodiments, the actuator 1200 may include one or more autofocus coils 1216 and one or more actuator magnets 1218, which may at least partly enable autofocus functionality such as moving the optical package 1202 along the z axis and/or along an optical axis defined by one or more lenses of the optical package 1202. In some examples, at least one position sensor magnet 1214 may be disposed proximate to at least one autofocus coil 1216. In some embodiments, at least one position sensor magnet 1214 may be coupled to at least one autofocus coil 1216. For instance, the autofocus coils 1216 may each define a central space that is encircled by the respective autofocus coil 1216. The position sensor magnets 1214 may be disposed within the central spaces encircled by the autofocus coils 1216. Additionally or alternatively, the position sensor magnets 1214 may be attached to support structures (not shown) that are fixed to the autofocus coils 1216. For example, a support structure, to which a position sensor magnet 1214 is attached, may be disposed within a central space encircled by an autofocus coil 1216 and the support structure may be fixed to the autofocus coil 1216.

In some embodiments, the actuator 1200 may include four suspension wires 1212. The optical package 1202 may be suspended with respect to the base 1204 by suspending one or more upper springs 1220 on the suspension wires 1212. In some embodiments, the actuator may include one or more lower springs 1222. In the optical package 1202, an optics component (e.g., one or more lens elements, a lens assembly, etc.) may be screwed, mounted or otherwise held in or by an optics holder. Note that upper spring(s) 1220 and lower spring(s) 1222 may be flexible to allow the optical package 1202 a range of motion along the Z (optical) axis for optical focusing, and suspension wires 1212 may be flexible to allow a range of motion on the x-y plane orthogonal to the optical axis for optical image stabilization. Also note that, while embodiments show the optical package 1202 suspended on wires 1212, other mechanisms may be used to suspend the optical package 1202 in other embodiments.

In various embodiments, the camera module may include an image sensor 1224. The image sensor 1224 may be disposed below the optical package 1202 such that light rays may pass through one or more lens elements of the optical package 1202 (e.g., via an aperture at the top of the optical package 1202) and to the image sensor 1224.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 13 illustrates a block diagram of an example portable multifunction device 1300 that may include a primary camera (e.g., the primary camera unit 102 illustrated in FIG. 1) and a subordinate camera (e.g., the subordinate camera unit 104 illustrated in FIG. 1), in accordance with some embodiments. Cameras 1364 are sometimes called "optical sensors" for convenience, and may also be known as or called an optical sensor system. Device 1300 may include memory 1302 (which may include one or more computer readable storage mediums), memory controller 1322, one or more processing units (CPUs) 1320, peripherals interface 1318, RF circuitry 1308, audio circuitry 1310, speaker 1311, touch-sensitive display system 1312, microphone 1313, input/output (I/O) subsystem 1306, other input or control devices 1316, and external port 1324. Device 1300 may include multiple optical sensors 1364 (e.g., the primary camera unit 102 and the subordinate camera unit 104 illustrated in FIG. 1). These components may communicate over one or more communication buses or signal lines 1303.

It should be appreciated that device 1300 is only one example of a portable multifunction device, and that device 1300 may have more or fewer components than shown, may combine two or more components, or may have a different configuration or arrangement of the components. The various components shown in FIG. 13 may be implemented in hardware, software, or a combination of hardware and software, including one or more signal processing and/or application specific integrated circuits.

Memory 1302 may include high-speed random access memory and may also include non-volatile memory, such as one or more magnetic disk storage devices, flash memory devices, or other non-volatile solid-state memory devices. Access to memory 1302 by other components of device 1300, such as CPU 1320 and the peripherals interface 1318, may be controlled by memory controller 1322.

Peripherals interface 1318 can be used to couple input and output peripherals of the device to CPU 1320 and memory 1302. The one or more processors 1320 run or execute various software programs and/or sets of instructions stored in memory 1302 to perform various functions for device 1300 and to process data.

In some embodiments, peripherals interface 1318, CPU 1320, and memory controller 1322 may be implemented on a single chip, such as chip 1304. In some other embodiments, they may be implemented on separate chips.

RF (radio frequency) circuitry 1308 receives and sends RF signals, also called electromagnetic signals. RF circuitry 1308 converts electrical signals to/from electromagnetic signals and communicates with communications networks and other communications devices via the electromagnetic signals. RF circuitry 1308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1308 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1310, speaker 1311, and microphone 1313 provide an audio interface between a user and device 1300. Audio circuitry 1310 receives audio data from peripherals interface 1318, converts the audio data to an electrical signal, and transmits the electrical signal to speaker 1311. Speaker 1311 converts the electrical signal to human-audible sound waves. Audio circuitry 1310 also receives electrical signals converted by microphone 1313 from sound waves. Audio circuitry 1310 converts the electrical signal to audio data and transmits the audio data to peripherals interface 1318 for processing. Audio data may be retrieved from and/or transmitted to memory 1302 and/or RF circuitry 1308 by peripherals interface 1318. In some embodiments, audio circuitry 1310 also includes a headset jack (e.g., 1412, FIG. 14). The headset jack provides an interface between audio circuitry 1310 and removable audio input/output peripherals, such as output-only headphones or a headset with both output (e.g., a headphone for one or both ears) and input (e.g., a microphone).

I/O subsystem 1306 couples input/output peripherals on device 1300, such as touch screen 1312 and other input control devices 1316, to peripherals interface 1318. I/O subsystem 1306 may include display controller 1356 and one or more input controllers 1360 for other input or control devices. The one or more input controllers 1360 receive/send electrical signals from/to other input or control devices 1316. The other input control devices 1316 may include physical buttons (e.g., push buttons, rocker buttons, etc.), dials, slider switches, joysticks, click wheels, and so forth. In some alternate embodiments, input controller(s) 1360 may be coupled to any (or none) of the following: a keyboard, infrared port, USB port, and a pointer device such as a mouse. The one or more buttons (e.g., 1408, FIG. 14) may include an up/down button for volume control of speaker 1311 and/or microphone 1313. The one or more buttons may include a push button (e.g., 1406, FIG. 14).

Touch-sensitive display 1312 provides an input interface and an output interface between the device and a user. Display controller 1356 receives and/or sends electrical signals from/to touch screen 1312. Touch screen 1312 displays visual output to the user. The visual output may include graphics, text, icons, video, and any combination thereof (collectively termed "graphics"). In some embodiments, some or all of the visual output may correspond to user-interface objects.

Touch screen 1312 has a touch-sensitive surface, sensor or set of sensors that accepts input from the user based on haptic and/or tactile contact. Touch screen 1312 and display controller 1356 (along with any associated modules and/or sets of instructions in memory 1302) detect contact (and any movement or breaking of the contact) on touch screen 1312 and converts the detected contact into interaction with user-interface objects (e.g., one or more soft keys, icons, web pages or images) that are displayed on touch screen 1312. In an example embodiment, a point of contact between touch screen 1312 and the user corresponds to a finger of the user.

Touch screen 1312 may use LCD (liquid crystal display) technology, LPD (light emitting polymer display) technology, or LED (light emitting diode) technology, although other display technologies may be used in other embodiments. Touch screen 1312 and display controller 1356 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1312. In an example embodiment, projected mutual capacitance sensing technology is used, such as that found in the iPhone®, iPod Touch®, and iPad® from Apple Inc. of Cupertino, Calif.

Touch screen 1312 may have a video resolution in excess of 800 dpi. In some embodiments, the touch screen has a video resolution of approximately 860 dpi. The user may make contact with touch screen 1312 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1312 or an extension of the touch-sensitive surface formed by the touch screen.

Device 1300 also includes power system 1362 for powering the various components. Power system 1362 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1300 may also include one or more optical sensors or cameras 1364. FIG. 13 shows an optical sensor 1364 coupled to optical sensor controller 1358 in I/O subsystem 1306. Optical sensor 1364 may include charge-coupled device (CCD) or complementary metal-oxide semiconductor (CMOS) phototransistors. Optical sensor 1364 receives light from the environment, projected through one or more lens, and converts the light to data representing an image. In conjunction with imaging module 1343 (also called a camera module), optical sensor 1364 may capture still images or video. In some embodiments, an optical sensor 1364 is located on the back of device 1300, opposite touch screen display 1312 on the front of the device, so that the touch screen display 1312 may be used as a viewfinder for still and/or video image acquisition. In some embodiments, another optical sensor is located on the front of the device so that the user's image may be obtained for videoconferencing while the user views the other video conference participants on the touch screen display.

Device 1300 may also include one or more proximity sensors 1366. FIG. 13 shows proximity sensor 1366 coupled to peripherals interface 1318. Alternately, proximity sensor 1366 may be coupled to input controller 1360 in I/O subsystem 1306. In some embodiments, the proximity sensor 1366 turns off and disables touch screen 1312 when the multifunction device 1300 is placed near the user's ear (e.g., when the user is making a phone call).

Device 1300 includes one or more orientation sensors 1368. In some embodiments, the one or more orientation sensors 1368 include one or more accelerometers (e.g., one or more linear accelerometers and/or one or more rotational accelerometers). In some embodiments, the one or more orientation sensors 1368 include one or more gyroscopes. In some embodiments, the one or more orientation sensors 1368 include one or more magnetometers. In some embodiments, the one or more orientation sensors 1368 include one or more of: global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1300. In some embodiments, the one or more orientation sensors 1368 include any combination of orientation/rotation sensors. FIG. 13 shows the one or more orientation sensors 1368 coupled to peripherals interface 1318. Alternately, the one or more orientation sensors 1368 may be coupled to an input controller 1360 in I/O subsystem 1306. In some embodiments, information is displayed on the touch screen display 1312 in a portrait view or a landscape view based on an analysis of data received from the one or more orientation sensors 1368.

In some embodiments, the software components stored in memory 1302 include operating system 1326, communication module (or set of instructions) 1328, contact/motion module (or set of instructions) 1330, graphics module (or set of instructions) 1332, text input module (or set of instructions) 1334, Global Positioning System (GPS) module (or set of instructions) 1335, arbiter module 1358 and applications (or sets of instructions) 1336. Furthermore, in some embodiments memory 1302 stores device/global internal state 1357. Device/global internal state 1357 includes one or more of: active application state, indicating which applications, if any, are currently active; display state, indicating what applications, views or other information occupy various regions of touch screen display 1312; sensor state, including information obtained from the device's various sensors and input control devices 1316; and location information concerning the device's location and/or attitude.

Operating system 1326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1328 facilitates communication with other devices over one or more external ports 1324 and also includes various software components for handling data received by RF circuitry 1308 and/or external port 1324. External port 1324 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1330 may detect contact with touch screen 1312 (in conjunction with display controller 1356) and other touch sensitive devices (e.g., a touchpad or physical click wheel). Contact/motion module 1330 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1330 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1330 and display controller 1356 detect contact on a touchpad.

Contact/motion module 1330 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1332 includes various known software components for rendering and displaying graphics on touch screen 1312 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1332 stores data representing graphics to be used. Each graphic may be assigned a corresponding code. Graphics module 1332 receives, from applications etc., one or more codes specifying graphics to be displayed along with, if necessary, coordinate data and other graphic property data, and then generates screen image data to output to display controller 1356.

Text input module 1334, which may be a component of graphics module 1332, provides soft keyboards for entering text in various applications (e.g., contacts 1337, e-mail 1340, IM 1341, browser 1347, and any other application that needs text input).

GPS module 1335 determines the location of the device and provides this information for use in various applications (e.g., to telephone 1338 for use in location-based dialing, to camera 1343 as picture/video metadata, and to applications that provide location-based services such as weather widgets, local yellow page widgets, and map/navigation widgets).

Applications 1336 may include the following modules (or sets of instructions), or a subset or superset thereof:
  contacts module 1337 (sometimes called an address book or contact list);
  telephone module 1338;
  video conferencing module 1339;
  e-mail client module 1340;
  instant messaging (IM) module 1341;
  workout support module 1342;
  camera module 1343 for still and/or video images;
  image management module 1344;
  browser module 1347;
  calendar module 1348;
  widget modules 1349, which may include one or more of: weather widget 1349-1, stocks widget 1349-2, calculator widget 1349-3, alarm clock widget 1349-4, dictionary widget 1349-5, and other widgets obtained by the user, as well as user-created widgets 1349-6;
  widget creator module 1350 for making user-created widgets 1349-6;
  search module 1351;
  video and music player module 1352, which may be made up of a video player module and a music player module;
  notes module 1353;
  map module 1354; and/or
  online video module 1355.

Examples of other applications 1336 that may be stored in memory 1302 include other word processing applications, other image editing applications, drawing applications, presentation applications, JAVA-enabled applications, encryption, digital rights management, voice recognition, and voice replication.

In conjunction with touch screen 1312, display controller 1356, contact module 1330, graphics module 1332, and text input module 1334, contacts module 1337 may be used to manage an address book or contact list (e.g., stored in application internal state 1357), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1338, video conference 1339, e-mail 1340, or IM 1341; and so forth.

In conjunction with RF circuitry 1308, audio circuitry 1310, speaker 1311, microphone 1313, touch screen 1312, display controller 1356, contact module 1330, graphics module 1332, and text input module 1334, telephone module 1338 may be used to enter a sequence of characters corresponding to a telephone number, access one or more telephone numbers in address book 1337, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1308, audio circuitry 1310, speaker 1311, microphone 1313, touch screen 1312, display controller 1356, optical sensor 1364, optical sensor controller 1358, contact module 1330, graphics module 1332, text input module 1334, contact list 1337, and telephone module 1338, videoconferencing module 1339 includes executable instructions to initiate, conduct, and terminate a video conference between a user and one or more other participants in accordance with user instructions.

In conjunction with RF circuitry 1308, touch screen 1312, display controller 1356, contact module 1330, graphics module 1332, and text input module 1334, e-mail client module 1340 includes executable instructions to create, send, receive, and manage e-mail in response to user instructions. In conjunction with image management module 1344, e-mail client module 1340 makes it very easy to create and send e-mails with still or video images taken with camera module 1343.

In conjunction with RF circuitry 1308, touch screen 1312, display controller 1356, contact module 1330, graphics module 1332, and text input module 1334, the instant messaging module 1341 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1308, touch screen 1312, display controller 1356, contact module 1330, graphics module 1332, text input module 1334, GPS module 1335, map module 1354, and music player module 1346, workout support module 1342 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1312, display controller 1356, optical sensor(s) 1364, optical sensor controller 1358, contact module 1330, graphics module 1332, and image management module 1344, camera module 1343 includes executable instructions to capture still images or video (including a video stream) and store them into memory 1302, modify characteristics of a still image or video, or delete a still image or video from memory 1302.

In conjunction with touch screen 1312, display controller 1356, contact module 1330, graphics module 1332, text input module 1334, and camera module 1343, image management module 1344 includes executable instructions to arrange, modify (e.g., edit), or otherwise manipulate, label, delete, present (e.g., in a digital slide show or album), and store still and/or video images.

In conjunction with RF circuitry 1308, touch screen 1312, display system controller 1356, contact module 1330, graphics module 1332, and text input module 1334, browser module 1347 includes executable instructions to browse the Internet in accordance with user instructions, including searching, linking to, receiving, and displaying web pages or portions thereof, as well as attachments and other files linked to web pages.

In conjunction with RF circuitry 1308, touch screen 1312, display system controller 1356, contact module 1330, graphics module 1332, text input module 1334, e-mail client module 1340, and browser module 1347, calendar module 1348 includes executable instructions to create, display, modify, and store calendars and data associated with calendars (e.g., calendar entries, to do lists, etc.) in accordance with user instructions.

In conjunction with RF circuitry 1308, touch screen 1312, display system controller 1356, contact module 1330, graphics module 1332, text input module 1334, and browser module 1347, widget modules 1349 are mini-applications that may be downloaded and used by a user (e.g., weather widget 549-1, stocks widget 549-2, calculator widget 13493, alarm clock widget 1349-4, and dictionary widget 1349-5) or created by the user (e.g., user-created widget 1349-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1308, touch screen 1312, display system controller 1356, contact module 1330, graphics module 1332, text input module 1334, and browser module 1347, the widget creator module 1350 may be used by a user to create widgets (e.g., turning a user-specified portion of a web page into a widget).

In conjunction with touch screen 1312, display system controller 1356, contact module 1330, graphics module 1332, and text input module 1334, search module 1351 includes executable instructions to search for text, music, sound, image, video, and/or other files in memory 1302 that match one or more search criteria (e.g., one or more user-specified search terms) in accordance with user instructions.

In conjunction with touch screen 1312, display system controller 1356, contact module 1330, graphics module 1332, audio circuitry 1310, speaker 1311, RF circuitry 1308, and browser module 1347, video and music player module 1352 includes executable instructions that allow the user to download and play back recorded music and other sound files stored in one or more file formats, such as MP3 or AAC files, and executable instructions to display, present or otherwise play back videos (e.g., on touch screen 1312 or on an external, connected display via external port 1324). In some embodiments, device 1300 may include the functionality of an MP3 player.

In conjunction with touch screen 1312, display controller 1356, contact module 1330, graphics module 1332, and text input module 1334, notes module 1353 includes executable instructions to create and manage notes, to do lists, and the like in accordance with user instructions.

In conjunction with RF circuitry 1308, touch screen 1312, display system controller 1356, contact module 1330, graphics module 1332, text input module 1334, GPS module 1335, and browser module 1347, map module 1354 may be used to receive, display, modify, and store maps and data associated with maps (e.g., driving directions; data on stores and other points of interest at or near a particular location; and other location-based data) in accordance with user instructions.

In conjunction with touch screen 1312, display system controller 1356, contact module 1330, graphics module 1332, audio circuitry 1310, speaker 1311, RF circuitry 1308, text input module 1334, e-mail client module 1340, and browser module 1347, online video module 1355 includes instructions that allow the user to access, browse, receive (e.g., by streaming and/or download), play back (e.g., on the touch screen or on an external, connected display via external port 1324), send an e-mail with a link to a particular online video, and otherwise manage online videos in one or more file formats, such as H.264. In some embodiments, instant messaging module 1341, rather than e-mail client module 1340, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1302 may store a subset of the modules and data structures identified above. Furthermore, memory 1302 may store additional modules and data structures not described above.

In some embodiments, device 1300 is a device where operation of a predefined set of functions on the device is performed exclusively through a touch screen and/or a touchpad. By using a touch screen and/or a touchpad as the primary input control device for operation of device 1300, the number of physical input control devices (such as push buttons, dials, and the like) on device 1300 may be reduced.

The predefined set of functions that may be performed exclusively through a touch screen and/or a touchpad include navigation between user interfaces. In some embodiments, the touchpad, when touched by the user, navigates device 1300 to a main, home, or root menu from any user interface that may be displayed on device 1300. In such embodiments, the touchpad may be referred to as a "menu button." In some other embodiments, the menu button may be a physical push button or other physical input control device instead of a touchpad.

Figure 14:
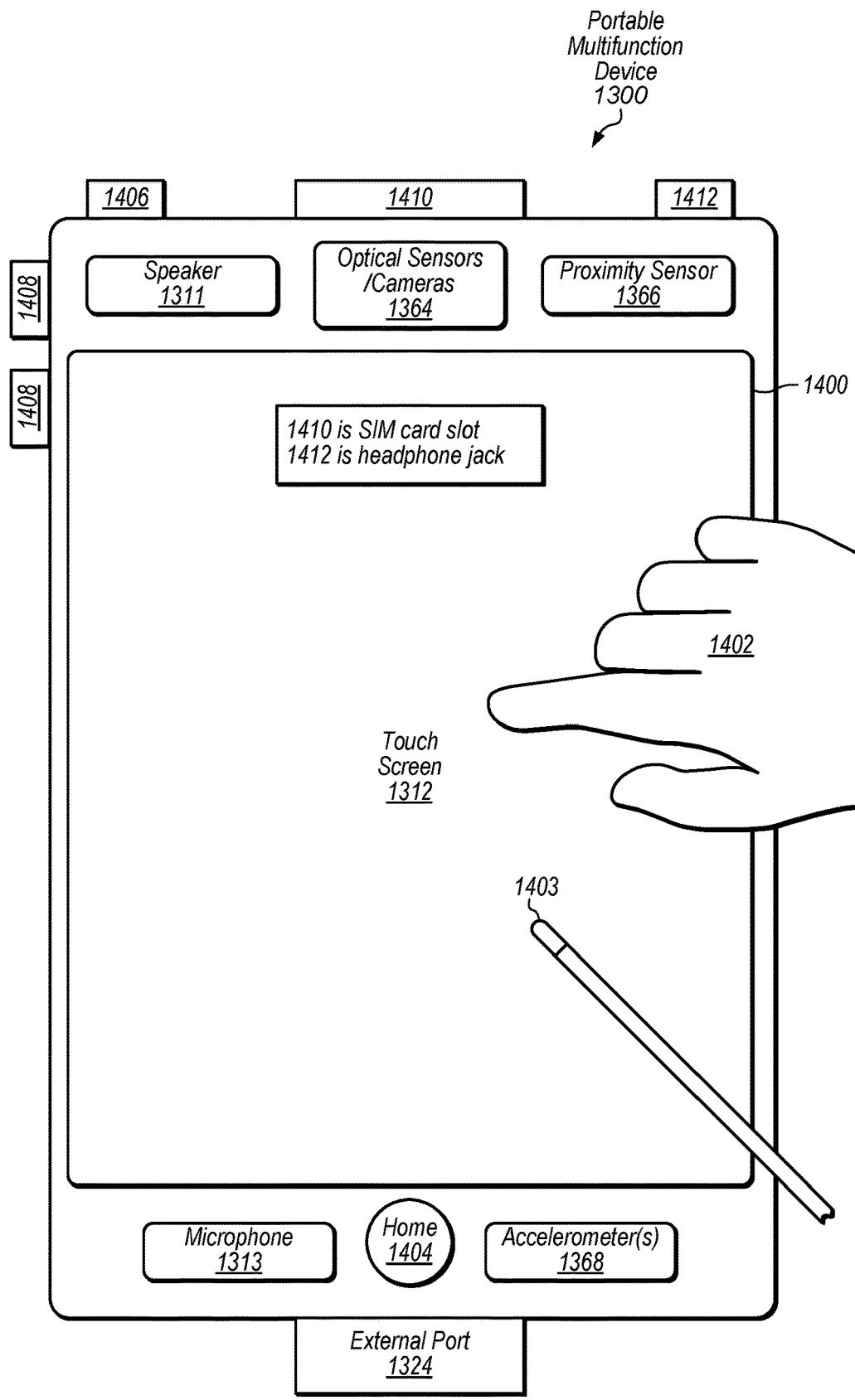
FIG. 14 illustrates an example portable multifunction device that may include a primary camera and a subordinate camera, in accordance with some embodiments.

FIG. 14 depicts illustrates an example portable multifunction device 1300 that may include a primary camera (e.g., the primary camera unit 102 illustrated in FIG. 1) and a subordinate camera (e.g., the subordinate camera unit 104 illustrated in FIG. 1), in accordance with some embodiments. The device 1300 may have a touch screen 1312. The touch screen 1312 may display one or more graphics within user interface (UI) 1400. In this embodiment, as well as others described below, a user may select one or more of the graphics by making a gesture on the graphics, for example, with one or more fingers 1402 (not drawn to scale in the figure) or one or more styluses 1403 (not drawn to scale in the figure).

Device 1300 may also include one or more physical buttons, such as "home" or menu button 1404. As described previously, menu button 1404 may be used to navigate to any application 1336 in a set of applications that may be executed on device 1300. Alternatively, in some embodiments, the menu button 1404 is implemented as a soft key in a GUI displayed on touch screen 1312.

In one embodiment, device 1300 includes touch screen 1312, menu button 1404, push button 1406 for powering the device on/off and locking the device, volume adjustment button(s) 1408, Subscriber Identity Module (SIM) card slot 1410, head set jack 1412, and docking/charging external port 1324. Push button 1406 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1300 also may accept verbal input for activation or deactivation of some functions through microphone 1313.

It should be noted that, although many of the examples herein are given with reference to optical sensor(s)/camera(s) 1364 (on the front of a device), one or more rear-facing cameras or optical sensors that are pointed opposite from the display may be used instead of, or in addition to, an optical sensor(s)/camera(s) 1364 on the front of a device.

Example Computer System

Figure 15:
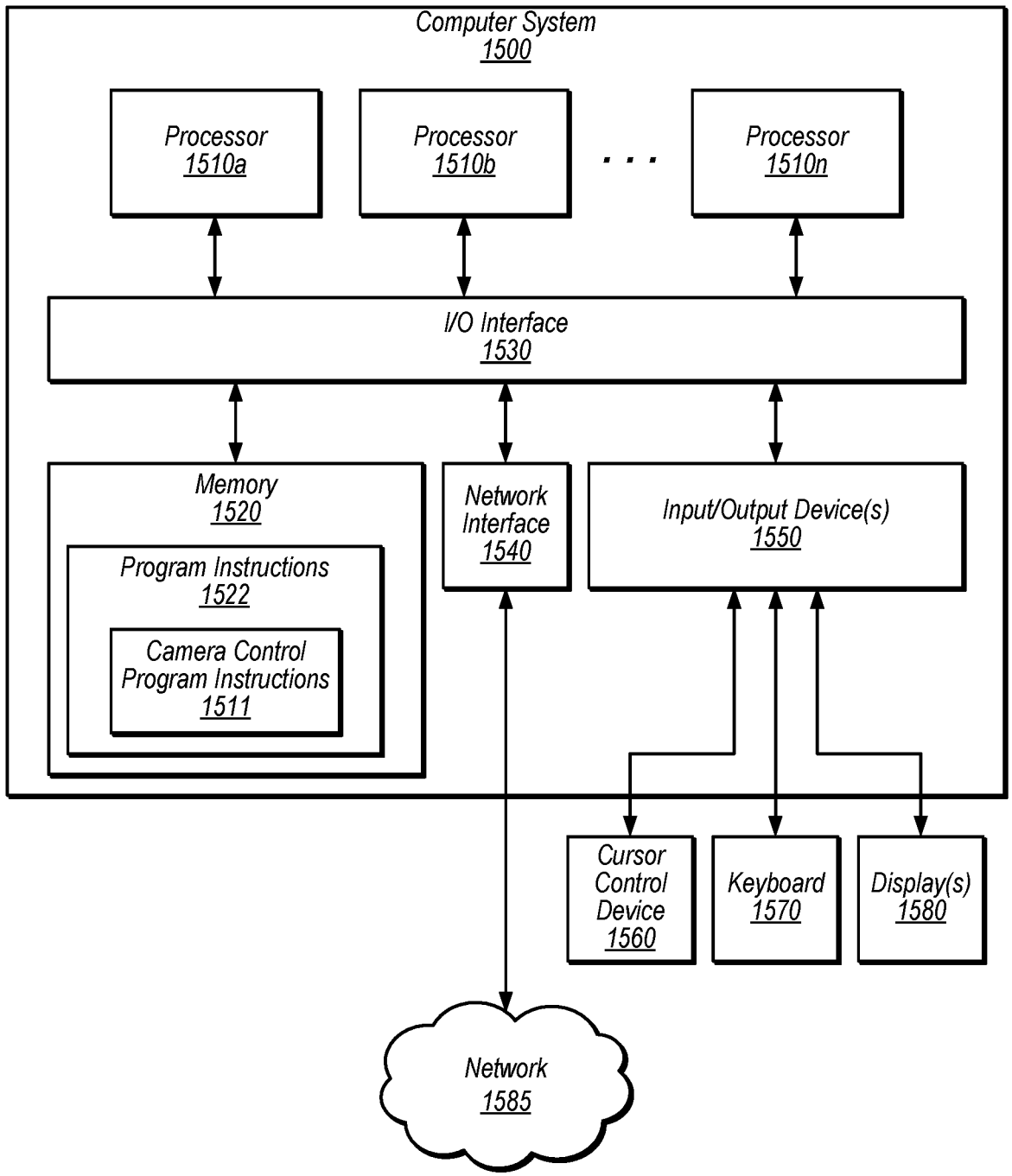
FIG. 15 illustrates an example computer system that may include a primary camera and a subordinate camera, according to some embodiments.

FIG. 15 illustrates an example computer system 1500 that may include a primary camera (e.g., the primary camera unit 102 illustrated in FIG. 1) and a subordinate camera (e.g., the subordinate camera unit 104 illustrated in FIG. 1), according to some embodiments. The computer system 1500 may be configured to execute any or all of the embodiments described above. In different embodiments, computer system 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1500, which may interact with various other devices. Note that any component, action, or functionality described above with respect to FIGS. 1-14 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store camera control program instructions 1522 and/or camera control data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 may be configured to implement a lens control application 1524 incorporating any of the functionality described above. Additionally, existing camera control data 1532 of memory 1520 may include any of the information or data structures described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one embodiment, the program instructions may implement the methods described above. In other embodiments, different elements and data may be included. Note that data may include any data or information described above.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera system, comprising:
   a first camera, including:
      a first set of one or more lenses that define a first optical axis; and a first actuator configured to move the first set of one or more lenses along the first optical axis to enable focusing for the first camera;
a second camera, including:
a second set of one or more lenses that define a second optical axis; and
a second actuator configured to move the second set of one or more lenses along the second optical axis to enable focusing for the second camera; and
a controller to:
transition from a first camera mode to a second camera mode, wherein:
in the first camera mode, the first camera is designated as a primary camera for focusing and the second camera is designated as a subordinate camera for focusing; and
in the second mode, the second camera is designated as the primary camera for focusing and the first camera is designated as the subordinate camera for focusing;
cause the primary camera to independently focus on an image subject based at least in part on image content corresponding to the image subject; and
cause the subordinate camera to focus on the image subject based at least in part on a focus relationship between the primary camera and the subordinate camera, wherein the focus relationship characterizes positioning of one or more lenses of the subordinate camera with respect to positioning of one or more lenses of the primary camera.

2. The camera system of claim 1, wherein the controller causes the first camera and the second camera to maintain continuity of focus on the image, across the transition from the first camera mode to the second camera mode.

3. The camera system of claim 1, wherein the focus relationship is based at least in part on:
a first focal length of the first camera; and
a second focal length of the second camera.

4. The camera system of claim 1, wherein the controller is further configured to:
determine the focus relationship during a first time period;
update, during a second time period after the first time period, the focus relationship to an updated focus relationship between the primary camera and the subordinate camera; and
cause the subordinate camera to focus based at least in part on the updated focus relationship.

5. The camera system of claim 4, wherein the controller is configured to update the focus relationship based at least in part on a variation in temperature associated with at least one of the first camera or the second camera.

6. The camera system of claim 1, further comprising:
a third camera, including:
a third set of one or more lenses that define a third optical axis; and
a third actuator configured to move the third set of one or more lenses along the third optical axis to enable focusing for the third camera;
wherein:
the focus relationship is a first focus relationship; and
the controller is further configured to:
determine a second focus relationship that characterizes positioning of one or more lenses of the third camera with respect to at least one of:
positioning of one or more lenses of the first camera; or
positioning of one or more lenses of the second camera; and
cause the third camera to focus on the image subject based at least in part on the second focus relationship.

7. The camera system of claim 1, wherein:
one of the first camera or the second camera is a telephoto lens camera; and
the other of the first camera or the second camera is a wide angle lens camera.

8. A device, comprising:
a first camera, including:
a first set of one or more lenses that define a first optical axis; and
a first actuator configured to move the first set of one or more lenses along the first optical axis to enable focusing for the first camera;
a second camera, including:
a second set of one or more lenses that define a second optical axis; and
a second actuator configured to move the second set of one or more lenses along the second optical axis to enable focusing for the second camera;
a display; and
one or more processors to:
transition from a first camera mode to a second camera mode, wherein:
in the first camera mode, the first camera is designated as a primary camera for focusing and the second camera is designated as a subordinate camera for focusing; and
in the second mode, the second camera is designated as the primary camera for focusing and the first camera is designated as the subordinate camera for focusing;
cause the primary camera to independently focus on an image subject based at least in part on image content corresponding to the image subject; and
cause the subordinate camera to focus on the image subject based at least in part on a focus relationship between the primary camera and the subordinate camera, wherein the focus relationship characterizes positioning of one or more lenses of the subordinate camera with respect to positioning of one or more lenses of the primary camera.

9. The device of claim 8, wherein the one or more processors cause the first camera and the second camera to maintain continuity of focus on the image, across the transition from the first camera mode to the second camera mode.

10. The device of claim 8, wherein:
the first camera has a first focal length; and
the second camera has a second focal length different than the first focal length.

11. The device of claim 8, wherein the one or more processors are further configured to:
determine the focus relationship during a first time period;
update, during a second time period after the first time period, the focus relationship to an updated focus relationship between the primary camera and the subordinate camera; and
cause the subordinate camera to focus based at least in part on the updated focus relationship.

12. The device of claim 8, wherein the one or more processors are further configured to determine the focus relationship based at least in part on a variation in temperature associated with at least one of the first camera or the second camera.

13. The device of claim 8, further comprising:
    a third camera, including:
        a third set of one or more lenses that define a third optical axis; and
        a third actuator configured to move the third set of one or more lenses along the third optical axis to enable focusing for the third camera;
    wherein:
        the focus relationship is a first focus relationship; and
        the one or more processors are further configured to:
            determine a second focus relationship that characterizes positioning of one or more lenses of the third camera with respect to at least one of:
                positioning of one or more lenses of the first camera; or
                positioning of one or more lenses of the second camera; and
            cause the third camera to focus on the image subject based at least in part on the second focus relationship.

14. The device of claim 13, wherein:
    at least one of the first camera, the second camera, or the third camera is a telephoto lens camera; and
    at least one of the first camera, the second camera, or the third camera is wide angle lens camera.

15. A method, comprising:
    transitioning from a first camera mode to a second camera mode, wherein:
        in the first camera mode, a first camera is designated as a primary camera for focusing and a second camera is designated as a subordinate camera for focusing; and
        in the second mode, the second camera is designated as the primary camera for focusing and the first camera is designated as the subordinate camera for focusing;
    focusing the primary camera on an image subject based at least in part on image content corresponding to the image subject; and
    focusing the subordinate camera on the image subject based at least in part on a focus relationship between the primary camera and the subordinate camera, wherein the focus relationship characterizes positioning of one or more lenses of the subordinate camera with respect to positioning of one or more lenses of the primary camera.

16. The method of claim 15, wherein the transitioning from the first camera mode to the second camera mode comprises:
    transitioning from the first camera mode to the second camera mode while maintaining continuity of focus on the image by the first camera and the second camera.

17. The method of claim 15, further comprising:
    determining the focus relationship during a first time period;
    updating, during a second time period after the first time period, the focus relationship to an updated focus relationship; and
    focusing the subordinate camera based at least in part on the updated focus relationship.

18. The method of claim 15, further comprising:
    determining the focus relationship based at least in part on:
        a first focal length of the first camera;
        a second focal length of the second camera; and
        a temperature associated with at least one of the first camera or the second camera.

19. The method of claim 18, further comprising:
    measuring the temperature via one or more sensors proximate one or more lenses of the at least one of the first camera or the second camera.

20. The method of claim 15, wherein:
    the focusing the primary camera on the image subject comprises:
        moving, via an actuator of the primary camera, one or more lenses of the primary camera along an optical axis of the primary camera; and
    the focusing the subordinate camera on the image subject comprises:
        moving, via an actuator of the subordinate camera, one or more lenses of the subordinate camera along an optical axis of the subordinate camera.

* * * * *